(12) United States Patent
Sun et al.

(10) Patent No.: US 11,984,608 B2
(45) Date of Patent: May 14, 2024

(54) BATTERY CELL, BATTERY, POWER CONSUMPTION APPARATUS, METHOD AND APPARATUS FOR PRODUCING BATTERY CELL

(71) Applicant: CONTEMPORARY AMPEREX TECHNOLOGY CO., LIMITED, Ningde (CN)

(72) Inventors: Dongsheng Sun, Ningde (CN); Kun Fang, Ningde (CN); Zhisheng Chai, Ningde (CN); Qingkui Chi, Ningde (CN); Haizu Jin, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/847,347

(22) Filed: Jun. 23, 2022

(65) Prior Publication Data
US 2022/0320644 A1 Oct. 6, 2022

Related U.S. Application Data

(63) Continuation of application No. PCT/CN2021/077510, filed on Feb. 23, 2021.

(51) Int. Cl.
*H01M 50/147* (2021.01)
*H01M 50/102* (2021.01)
(Continued)

(52) U.S. Cl.
CPC ....... *H01M 50/147* (2021.01); *H01M 50/102* (2021.01); *H01M 50/317* (2021.01);
(Continued)

(58) Field of Classification Search
None
See application file for complete search history.

(56) References Cited

U.S. PATENT DOCUMENTS 6,042,967 A * 3/2000 Sargeant ............. H01M 50/183
429/57
6,838,207 B1* 1/2005 Sugita ................. H01M 50/169
429/82
(Continued)

FOREIGN PATENT DOCUMENTS

CN 104319360 A 1/2015
CN 106531909 A 3/2017
(Continued)

OTHER PUBLICATIONS

Extended European Search Report dated Jan. 16, 2023 received in European Patent Application No. EP 21827164.1.

*Primary Examiner* — Alix E Eggerding
(74) *Attorney, Agent, or Firm* — Scully, Scott, Murphy & Presser, P.C.

(57) ABSTRACT

Disclosed is a battery cell, a battery, a power consumption apparatus and a method and an apparatus for producing a battery cell. The battery cell includes: a housing, with a first opening; an electrode assembly, arranged in the housing; an end cover assembly, including an end cover, a pressure relief mechanism and a first insulating member, the end cover covers the first opening, the pressure relief mechanism is arranged on the end cover, the pressure relief mechanism is configured, when an internal pressure or temperature of the battery cell reaches a threshold, to be actuated, the first insulating member is located on a side of the end cover close to the electrode assembly to isolate the electrode assembly and the end cover, and the first insulating member is
(Continued)

configured that a projection on the end cover along a thickness direction of the end cover covers the pressure relief mechanism.

21 Claims, 12 Drawing Sheets

(51) Int. Cl.
*H01M 50/317* (2021.01)
*H01M 50/533* (2021.01)
*H01M 50/543* (2021.01)

(52) U.S. Cl.
CPC ....... *H01M 50/533* (2021.01); *H01M 50/543* (2021.01); *H01M 2220/20* (2013.01); *H01M 2220/30* (2013.01)

(56) References Cited

U.S. PATENT DOCUMENTS

| | | | |
|---|---|---|---|
| 8,709,630 | B2 | 4/2014 | Kim et al. |
| 8,927,141 | B2 | 1/2015 | Kim et al. |
| 9,806,312 | B2 | 10/2017 | Li et al. |
| 2011/0091752 | A1 | 4/2011 | Kim et al. |
| 2011/0097613 | A1 | 4/2011 | Kim et al. |
| 2016/0133900 | A1 | 5/2016 | Li et al. |
| 2016/0133901 | A1 | 5/2016 | Li et al. |
| 2016/0293916 | A1 | 10/2016 | Yamazaki et al. |

FOREIGN PATENT DOCUMENTS

| | | |
|---|---|---|
| CN | 208690318 U | 4/2019 |
| CN | 111490212 A | 8/2020 |

\* cited by examiner

BATTERY CELL, BATTERY, POWER CONSUMPTION APPARATUS, METHOD AND APPARATUS FOR PRODUCING BATTERY CELL

CROSS-REFERENCE TO RELATED APPLICATIONS

This application is a continuation of International Application No. PCT/CN2021/077510, filed on Feb. 23, 2021, the disclosure of which is hereby incorporated by reference in its entirety.

TECHNICAL FIELD

The present application relates to a field of battery technology, and in particular, to a battery cell, a battery, a power consumption apparatus, a method and an apparatus for producing a battery cell.

BACKGROUND

In the trend of energy conservation and emission reduction, batteries are widely used in a field of new energy, such as electric vehicles, new energy vehicles, etc., and the electric vehicles have become an important part of a sustainable development of an automotive industry.

In the development of battery technology, safety performance and service life of a battery are elements that cannot be ignored. During use of the battery, leakage often has a relatively large undesirable effect on the safety performance and service life of the battery.

SUMMARY

The present application aims to provide a battery cell, a battery, a power consumption apparatus, a method and an apparatus for producing a battery cell, such that a problem of battery leakage can be alleviated to improve safety performance and service life of the battery.

In a first aspect, embodiments of the present application provide a battery cell, including:
 a housing, with a first opening;
 an electrode assembly, arranged in the housing;
 an end cover assembly, including an end cover, a pressure relief mechanism and a first insulating member, the end cover covers the first opening, the pressure relief mechanism is arranged at the end cover, the pressure relief mechanism is configured to be actuated to relieve the internal pressure of the battery cell, when an internal pressure or temperature of the battery cell reaches a threshold, the first insulating member is located on a side of the end cover close to the electrode assembly to isolate the electrode assembly and the end cover, and the first insulating member is configured that a projection of the first insulating member on the end cover along a thickness direction of the end cover covers the pressure relief mechanism to protect the pressure relief mechanism.

In the technical solution of the embodiments of the present application, the battery cell is provided with the pressure relief mechanism, and when the internal pressure or temperature of the battery cell reaches a predetermined threshold, the pressure relief mechanism is actuated to relieve the internal pressure or temperature to ensure the safety of the battery cell; when the battery cell is impacted, or dropped from a high place, etc., causing an electrolytic solution inside the battery cell to shake, and the first insulating member is used to completely cover the pressure relief mechanism to prevent the pressure relief mechanism from opening or cracking due to an impact from electrolytic solution's shaking, which results in leakage of the electrolytic solution, thereby increasing life of the battery cell.

In an embodiment of the present application, optionally, the pressure relief mechanism and the first insulating member are configured with a first gap in the thickness direction of the end cover, the battery cell further includes a flow path, and the flow path is configured to communicate the inside of the battery cell with the first gap.

When the internal pressure or temperature of the battery cell reaches the threshold, the pressure relief mechanism is actuated under the pressure, and a gas inside the battery cell reaches the first gap through the flow path to be relieved from the pressure relief mechanism, so that functions of the pressure relief mechanism can be ensured while the leakage of the battery cell can be reduced, thereby improving the safety of the battery cell.

In an embodiment of the present application, optionally, the flow path includes a second opening arranged on the first insulating member, and the second opening is configured that a projection on the end cover along the thickness direction of the end cover is staggered with the pressure relief mechanism.

The second opening on the first insulating member enables emissions inside the battery cell to be smoothly relieved from the pressure relief mechanism. Since the second opening on the first insulating member is staggered with the pressure relief mechanism, when the electrolytic solution shakes in the housing due to impact or drop of the battery, it can effectively prevent the electrolytic solution from impacting the pressure relief mechanism, and even if the electrolytic solution flows to the first gap from the second opening, impact force mainly acts on the end cover, and the pressure relief mechanism may not be directly impacted.

In an embodiment of the present application, optionally, the second opening is located at an outer perimeter of the first insulating member.

When the second opening is located at the outer perimeter of the first insulating member, the electrode assembly is not easy to block the second opening compared with a position arranged in the middle of the first insulating member, so as to ensure the emissions can be smoothly relieved, thereby improving the safety of the battery.

In an embodiment of the present application, optionally, the first insulating member includes a base wall and a side wall, the base wall is arranged opposite to the end cover, the first gap is formed between the base wall and the end cover, the side wall is arranged around the outer perimeter of the base wall, and the second opening is arranged on the side wall.

The side wall is arranged around the outer perimeter of the base wall, which can improve a structural strength of the base wall and enable the base wall to be not easily flexed and deformed. At the same time, since the second opening is arranged on the side wall, it can further prevent the second opening from being blocked and ensure that the second opening can communicate the inside of the battery cell with the first gap to smoothly relieve the emissions, thereby ensuring the safety of the battery cell. In an embodiment of the present application, optionally, the side wall has a first end close to the end cover and a second end away from the end cover, and the second opening is a groove of the side wall recessed from the first end towards the second end.

In an embodiment of the present application, optionally, the first end protrudes from the base wall, and a depth of the groove is smaller than a height of the first end protruding from the base wall.

Since the depth of the groove is less than the height of the first end protruding from the base wall, the side wall can still maintain a state surrounding the base wall when possessing the second opening, thereby ensuring the structural strength and making the base wall not easy to be deformed.

In an embodiment of the present application, optionally, the first end abuts against the end cover, and the second end abuts against the electrode assembly.

The end cover tightly presses the electrode assembly through the first insulating member, so that the electrode assembly is restrained in an axial direction, thereby preventing the electrode assembly from shaking in the axial direction. In an embodiment of the present application, optionally, the battery cell further includes:

an electrode terminal, fixed to the end cover;
an adapting member, including a first connection section, a second connection section and a third connection section stacked in sequence, where the first connecting section is configured to be connected with the electrode assembly, the third connection section is configured to be connected with the electrode terminal, and the second connection section is configured to connect the first connection section and the third connection section;
the base wall includes a first base and a second base, a step is formed between the first base and the second base, the first base abuts against the third connection section, and the second base abuts against the second connection section; and
the side wall includes a first part and a second part, the first part is connected to the outer perimeter of the first base, the second part is connected to the outer perimeter of the second base, and the second opening is arranged at the second part.

The first connection section, the second connection section and the third connection section of the adapting member are stacked in sequence, where the second connection section and the third connection section form a stepped structure, so as to reverse more space at a position corresponding to the pressure relief mechanism; and the base wall forms the step, which can not only tightly press the adapting member, but also increase the first gap at the position corresponding to the second gap. By arranging as above, the first gap can be arranged as large as possible without increasing an overall thickness of the end cover assembly, so that an exhaust rate can be as high as possible when the pressure is required to be relieved, thereby improving the safety of the battery cell.

Moreover, since the second opening is located at the second part, the first gap is relatively enlarged here, which enables the emissions in the flow path to rapidly enter the first gap, further playing the effect of rapidly relieving and improving the safety of the battery cell.

In an embodiment of the present application, optionally, a central angle corresponded to a projection of the second opening projected on the end cover along the thickness direction of the end cover at least partially overlaps with a central angle corresponded to the pressure relief mechanism.

In the above technical solution, a distance between the second opening and the pressure relief mechanism is relatively short, the emissions can reach the pressure relief mechanism and be discharged relatively rapidly, thereby increasing the responsiveness of the pressure relief mechanism.

In an embodiment of the present application, optionally, a first positioning portion is arranged on the end cover, a second positioning portion is arranged on the base wall, and the first positioning portion is matched with the second positioning portion to implement a peripheral positioning of the end cover and the first insulating member.

The end cover is matched with the first insulating member through the first positioning portion and the second positioning portion, which can not only implement a quick and correct assembly of the end cover and the first insulating member, but also define a relative position of the end cover and the first insulating member in a peripheral direction, so as to ensure that the second opening and the pressure relief mechanism maintain their relative positions, thereby ensuring the safety and structural stability of the battery cell.

In an embodiment of the present application, optionally, an area of the second opening is greater than or equal to one half of an area of the pressure relief mechanism.

It is arranged that the area of the second opening is greater than or equal to one half of the area of the pressure relief mechanism, which can avoid a problem that the area of the second opening is too small to normally actuate the pressure relief mechanism, and ensure that a valve opening pressure value is reached at the first gap at least when the internal pressure of the battery cell reaches a limit pressure value, thereby ensuring the safety of the battery cell.

In an embodiment of the present application, optionally, the flow path comprises a second gap formed between an outer perimeter of the first insulating member and an inner wall of the housing, and the second gap is configured that a projection of the second gap on the end cover along the thickness direction of the end cover is staggered with the pressure relief mechanism.

The second gap is used to directly communicate with the first gap, or the second gap communicates with the second gap through the second opening, so as to meet requirements for relieving the pressure through the pressure relief mechanism, and to prevent the electrolytic solution from impacting the pressure relief mechanism as well by staggering the second gap with the pressure relief mechanism.

In an embodiment of the present application, optionally, a smallest gas flow area of the second gap is greater than or equal to one half of the area of the pressure relief mechanism.

When the smallest gas flow area of the second gap is greater than or equal to one half of the pressure relief mechanism, it can effectively avoid a problem that the gas flow area of the second gap is too small to normally actuate the pressure relief mechanism, and can ensure that the valve opening pressure value is reached at the first gap at least when the internal pressure of the battery cell reaches the limit pressure value, thereby ensuring the safety of the battery cell.

In an embodiment of the present application, optionally, at least part of the outer perimeter of the first insulating member is an inclined face, so that a width of the second gap gradually increases along a direction away from the end cover.

Since the first insulating member is the inclined face at least at the second gap, it can not only facilitate the gas to converge into the second gap and enter the first gap to be relieved, but also avoid the blockage of the second gap due to an interference between the first insulating member and the inner wall of the housing caused by manufacturing tolerances. In addition, a condition of an interference between the end cover assembly and the inner wall of the housing can be reduced when the end cover assembly is assembled to the second opening of the housing.

In a second aspect, the embodiments of the present application provides a battery, including the aforesaid battery cell.

For the battery provided by the embodiment, each battery cell inside the battery has a pressure relief mechanism respectively to ensure the safety, and the pressure relief mechanism is not easy to be damaged when each battery cell is impacted or dropped. Overall durability and safety performance of the battery are good.

In a third aspect, the embodiments of the present application provide a power consumption apparatus, including the aforementioned battery, and the battery is configured to provide electrical energy.

The power consumption apparatus provided in the embodiment is installed with a battery with good drop-proof performance, durability performance and safety performance, and power supply reliability of the battery is high. The power consumption apparatus has effects of stable operation, high safety and good durability.

In a fourth aspect, the embodiments of the present application provides a method for producing a battery cell, including:
 providing a housing, and the housing has a first opening;
 providing an electrode assembly;
 providing an end cover assembly, the end cover assembly includes an end cover, a pressure relief mechanism and a first insulating member, the pressure relief mechanism is arranged at the end cover, and the pressure relief pressure mechanism is configured to be actuated to relieve the internal pressure of the battery cell when an internal pressure or temperature of the battery cell reaches a threshold, the first insulating member is located on a side of the end cover, and the first insulating member is configured that a projection of the first insulating member on the end cover along a thickness direction of the end cover covers the pressure relief mechanism to protect the pressure relief mechanism; and
 placing the electrode assembly in the housing, and covering the end cover over the first opening, so that the first insulating member is located on a side of the end cover close to the electrode assembly to isolate the electrode assembly and the end cover.

In a fifth aspect, the embodiments of the present application provides an apparatus for producing a battery cell, including:
 a first providing, configured apparatus to provide a housing, and the housing has a first opening;
 a second providing apparatus, configured to providing an electrode assembly;
 a third providing apparatus, configured to provide an end cover assembly, the end cover assembly includes an end cover, a pressure relief mechanism and a first insulating member, the pressure relief mechanism is arranged at the end cover, the pressure relief mechanism is configured to be actuated to relieve the internal pressure of the battery cell, when an internal pressure or temperature of the battery cell reaches a threshold, the first insulating member is located on a side of the end cover, and the first insulating member is configured that a projection of the first insulating member on the end cover along a thickness direction of the end cover covers the pressure relief mechanism to protect the pressure relief mechanism; and
 an assembling apparatus, configured to place the electrode assembly in the housing, and cover the end cover at the first opening, so that the first insulating member is located on a side of the end cover close to the electrode assembly to isolate the electrode assembly and the end cover.

The above description is only an overview of the technical solution of the embodiments of the present application. In order to better understand the technical means of the embodiments of the present application, it can be implemented in accordance with the content of the description, and in order to make the above and other objectives, features and advantages of the embodiments of the present application more obvious and understandable, the specific embodiments of the present application is given as follows.

BRIEF DESCRIPTION OF DRAWINGS

In order to illustrate the technical solution in the embodiments of the present application more clearly, brief description will be made below to the drawings required in the embodiments of the present application. Apparently, the drawings described below are some embodiments of the present application only, and other drawings could be obtained based on these drawings by those ordinary skilled in this field without creative efforts.

Figure 1:
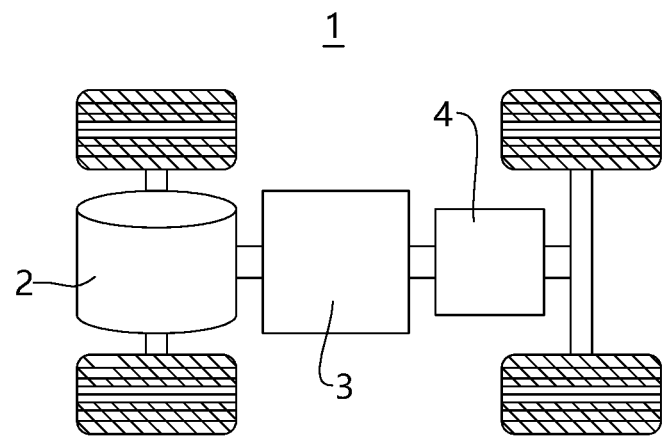
FIG. 1 is a schematic diagram of a vehicle provided by an embodiment of the present application.

In the accompanying drawings, the drawings are not drawn to actual scale.

DESCRIPTION OF EMBODIMENTS

To make the objectives, technical solutions and advantages of the embodiments of the present application clearer, the following clearly describes the technical solutions in the embodiments of the present application with reference to the drawings in the embodiments of the present application. Apparently, the described embodiments are some but not all of the embodiments of the present application. All the other embodiments obtained by those of ordinary skill in the art based on the embodiments of the present application without any inventive effort shall fall within the scope of protection of the present application.

Unless otherwise defined, all technical and scientific terms used in the present application have the same meanings as those commonly understood by those skilled in the art to which the present application belongs. The terms used in the specification of the present application are merely for the purpose of describing specific embodiments, but are not intended to limit the present application. The terms "including" and "having" and any variations thereof in the specification and the claims of the present application as well as the foregoing description of the drawings are intended to cover non-exclusive inclusions. The terms "first", "second" and the like in the specification and the claims of the present application as well as the foregoing description of the drawings are used to distinguish different objects, rather than to describe a specific order or primary-secondary relationship.

The phrase "embodiments" referred to in the present application means that the descriptions of specific features, structures, and characteristics in combination with the embodiments are included in at least one embodiment of the present application. The phrase at various locations in the specification does not necessarily refer to the same embodiment, or an independent or alternative embodiment exclusive of another embodiment. Those skilled in the art understand, in explicit and implicit manners, that an embodiment described in the present application may be combined with other embodiments.

In the description of the present application, it should be noted that unless otherwise explicitly specified and defined, the terms "mounting", "connecting", "connection" and "attaching" should be understood in a broad sense, for example, they may be a fixed connection, also a detachable connection, or an integrated connection; may be a direct connection and may also be an indirect connection via an intermediate medium, or may be communication between the inner portions of two elements. Those of ordinary skill in the art may appreciate the specific meanings of the foregoing terms in the present application according to specific circumstances.

In the present application, the term "and/or" is only an association relation describing associated objects, which means that there may be three relations. For example, A and/or B may represent three situations: A exists alone, both A and B exist, and B exists alone. In addition, the character "/" in the present application generally indicates that the associated objects before and after the character are in an "or" relation.

In the embodiments of the present application, same components are denoted by same reference numerals, and detailed description of the same components is omitted in different embodiments for brevity. It should be understood that dimensions such as thicknesses, lengths and widths of various components in embodiments of the present application shown in the drawings, as well as dimensions of the overall thickness, length and width of an integrated apparatus are merely illustrative, and should not constitute any limitation to the present application.

In the present application, "a plurality of" means two or more (including two), similarly, "a plurality of groups" means two or more groups (including two groups), and "a plurality of sheets" means two or more sheets (including two sheets).

In the present application, battery cells may include lithium-ion secondary batteries, lithium-ion primary batteries, lithium-sulfur batteries, sodium-lithium-ion batteries, sodium-ion batteries or magnesium-ion batteries, etc., which are not limited by the embodiments of the present application. The battery cell may be cylindrical, flat, cuboid or other shapes, which are not limited by the embodiments of the present application as well. The battery cell is generally divided into three types according to the way of packaging: a cylindrical battery cell, a prismatic battery cell and a soft package battery cells, which are not limited by the embodiments of the present application as well.

The battery mentioned in the embodiment of the present application refers to a single physical module that includes one or more battery cells to provide a higher voltage and capacity. For example, the battery mentioned in the present application may include a battery module, a battery pack or the like. The battery generally includes a box body for enclosing one or more battery cells. The box body may prevent liquid or other foreign matters from affecting the charging or discharging of the battery cell.

The battery cells includes an electrode assembly and an electrolytic solution, and the electrode assembly includes a positive electrode sheet, a negative electrode sheet and a separator. The operation of the battery cell mainly relies on the movement of metal ions between the positive electrode sheet and the negative electrode sheet. The positive electrode sheet includes a positive electrode current collector and a positive electrode active material layer. The positive electrode active material layer is coated on a surface of the positive electrode current collector, a current collector not coated with the positive electrode active material layer protrudes from a current collector coated with the positive electrode active material layer, and the current collector not coated with the positive electrode active material layer is regarded as a positive electrode tab. As an example, in a lithium-ion battery, a material of the positive electrode current collector may be aluminum, and the positive electrode active material may be lithium cobalt oxides, lithium iron phosphate, ternary lithium, lithium manganate, or the like. The negative electrode sheet includes a negative electrode current collector and a negative electrode active material layer. The negative electrode active material layer is coated on a surface of the negative electrode current collector, a current collector not coated with the negative electrode active material layer protrudes from a current collector coated with the negative electrode active material layer, and the current collector not coated with the negative electrode active material layer is regarded as a negative electrode tab. A material of the negative electrode current collector may be copper, and the negative electrode active material may be carbon, silicon, or the like. In order to ensure that no fusing occurs when a large current passes, there are a plurality of positive electrode tabs which are stacked together, and there are a plurality of negative electrode tabs which are stacked together. A material of the separator may be PP, PE, or the like. In addition, the electrode assembly may be a winding structure or a laminated structure, and the embodiments of the present application are not limited thereto. With the development of battery technology, it is necessary to consider many design factors at the same time, such as energy density, cycle life, discharge capacity, charge-discharge rate and other performance parameters. In addition, safety of batteries should also be considered.

With regard to the battery cell, main safety hazards come from charging and discharging processes, and a suitable environmental temperature design is also required. In order to effectively avoid unnecessary losses, at least triple protection measures are generally taken for the battery cell. Specifically, the protection measures include at least a switching element, a properly selected separator material and a pressure relief mechanism. The switching element refers to an element that can stop the charging or discharging of the battery when the temperature or resistance in a battery cell reaches a certain threshold. The separator is used to isolate the positive electrode sheet from the negative electrode sheet and can automatically dissolve micron-sized (or even nanoscale) micropores attached to the separator when the temperature rises to a certain value, thereby preventing metal ions from passing through the separator and terminating an internal reaction of the battery cell.

The pressure relief mechanism refers to an element or a component that is actuated to relieve an internal pressure or temperature when the internal pressure or temperature of the battery cell reaches a predetermined threshold. The threshold design varies from different design requirements. The threshold may be determined by materials of one or more of the positive electrode sheet, the negative electrode sheet, the electrolytic solution and the separator in the battery cell.

The "actuation" mentioned in the present application refers to that the pressure relief mechanism produces an action or is activated to a certain state, so that the internal pressure and temperature of the battery cell can be relieved. The action produced by the pressure relief mechanism may include but not be limited to: at least a portion of the pressure relief mechanism being fractured, broken, torn or opened, and so on. When the pressure relief mechanism is actuated, high-temperature and high-pressure substances inside the battery cell are discharged outwards from an actuated position as emissions. In this way, the pressure in the battery cell can be relieved at a controllable pressure or temperature, thereby avoiding more serious potential accidents.

The emissions from the battery cell mentioned in the present application include but are not limited to: the electrolytic solution, the dissolved or split positive and negative electrode sheets, fragments of the separator, high-temperature and high-pressure gas generated by reaction, flame, etc.

The pressure relief mechanism on the battery cell has an important impact on the safety of the battery. For example, when short circuit, overcharge or other phenomena occurs, it may lead to thermal runaway of inside the battery cell, resulting in a sudden increase of pressure or temperature. In this case, the internal pressure and temperature may be released outwards through the actuation of the pressure relief mechanism, to prevent the battery cell from exploding and catching fire.

The pressure relief mechanism may take the form of an anti-explosion valve, an air valve, a pressure relief valve, a safety valve or the like, and may specifically adopt a pressure-sensitive or temperature-sensitive element or structure. That is, when the internal pressure or temperature of the battery cell reaches the predetermined threshold, the pressure relief mechanism performs an action or a weakened structure provided in the pressure relief mechanism is damaged, so as to form a through opening or a channel for relieving the internal pressure or temperature.

The battery cell sometimes leaks during use. When the battery cell leaks, it means that the battery cell cannot work normally, thereby affecting lifetime of the battery cell. The inventor researched and found that a leak location often occurs at the pressure relief mechanism, and even if there is no abnormal gas production or high temperature problem in the battery cell, there may be a leakage occurring at the pressure relief mechanism. After the leakage, the inventor replaced with the pressure relief mechanism with a better quality, but the problem of the leakage still were not solved. Therefore, the inventor further researched and found that when the battery cell is impacted or dropped, the electrolytic solution may shake inside the battery cell and then shock the pressure relief mechanism, resulting in the opening, damage or cracking at the pressure relief mechanism, thus the leakage of the electrolytic solution. Even when the electrolytic solution shocks the pressure relief mechanism and does not result in any obvious damage of the pressure relief mechanism except some hardly observable cracks, it still reduces the structural strength of the pressure relief mechanism. In the subsequent usage process, an abnormal situation may occur such like the internal pressure of the battery cell is within a normal range but the pressure relief mechanism is still actuated, thereby reducing the safety and service life of the battery cell.

In view of this, in order to enhance the safety and service life of the battery cell, the embodiments of the present application provide a technical solution, that is, a protective structure for shielding the pressure relief mechanism is arranged at a position corresponding to the pressure relief mechanism of the battery cell, and when the electrolytic solution inside the battery cell shakes, the protective structure blocks impulse towards the pressure relief mechanism, so as to avoid the damages to the pressure relief mechanism, thereby further solving a problem of the reduced safety and service life of the battery cell caused by the leakage.

The technical solution described in the embodiments of the present application are all applicable to various devices using batteries, such as mobile phones, portable apparatuses, notebook computers, electromobiles, electric toys, electric tools, electric vehicles, ships, spacecrafts and so on. For example, the spacecrafts include airplanes, rockets, space shuttles, spaceships and so on.

It should be understood that the technical solution described in the embodiments of the present application are not only applicable to the devices described above, but also applicable to all devices using batteries. However, for ease of description, the following embodiments are all described by an example of an electric vehicle.

For example, as shown in FIG. 1, FIG. 1 is a vehicle 1 according to an embodiment of the present application. The vehicle 1 may be a fuel-powered vehicle, a gas-powered vehicle or a new energy vehicle, and the alternative fuel vehicle may be a battery electric vehicle, a hybrid vehicle, an extended-range vehicle, or the like. A motor 2, a controller 3 and a battery 4 may be arranged inside the vehicle 1, and the controller 3 is used to control the battery 4 to supply power to the motor 2. For example, the battery 4 may be disposed at the bottom, head or tail of the vehicle 1. The battery 4 may be used for power supply of the vehicle 1. For example, the battery 4 may serve as an operation power source of the vehicle 1 for a circuit system of the vehicle 1, for example, for a working power demand of the vehicle 1 during startup, navigating and running. In another embodiment of the present application, the battery 4 may not only serve as an operation power source of the vehicle 1, but also as a driving power source of the vehicle 1, replacing or partially replacing fuel or natural gas to provide driving power for the vehicle 1.

Figure 2:
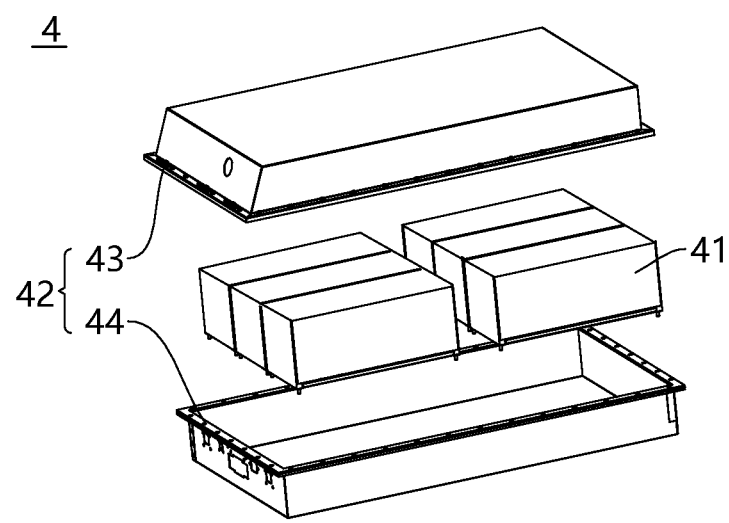
FIG. 2 is a structural schematic diagram of a battery provided by an embodiment of the present application.
Figure 3:
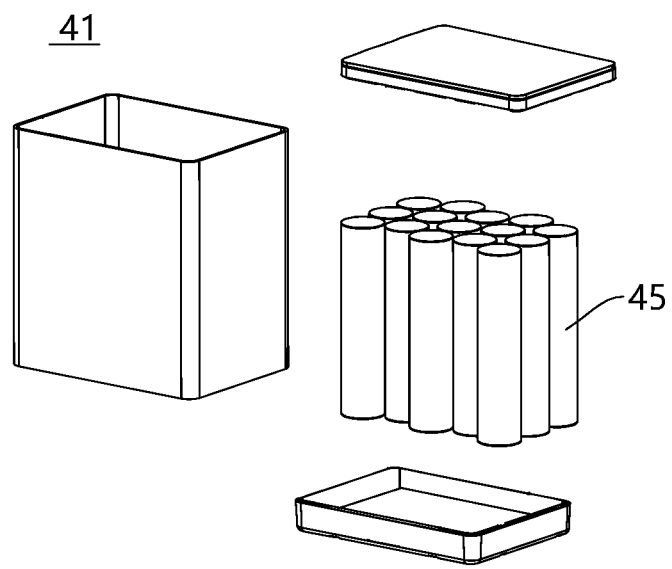
FIG. 3 is an exploded view of a battery module provided by an embodiment of the present application.

In order to meet different power demands, the battery 4 may include a plurality of battery cells, where the plurality of battery cells may be in series connection, parallel connection or series-parallel connection. The series-parallel connection refers to a combination of series connection and parallel connection. The battery 4 may also be called the battery pack. Optionally, as a combination of shown in FIG. 2 and FIG. 3, a plurality of battery cells may be firstly connected in series, in parallel or in series-parallel to form a battery module 41, and then a plurality of battery modules 41 are connected in series, in parallel or in series-parallel to form the battery 4. That is, the plurality of battery cells may directly form the battery 4, or may first form the battery module 41, and then the battery modules 41 form the battery 4.

The battery 4 may include a plurality of battery cells. The battery 4 may further include a box body 42 (or a covering). The inner part of the box body 42 is a hollow structure, and the plurality of battery cells are accommodated in the box body 42. The box body 42 may include two parts for accommodating (refer to FIG. 2), which are regarded herein as a cover body 34 and a lower box body 44, respectively, and the cover body 43 and the lower box body 44 are buckled together. The shapes of the cover body 43 and the lower box body 44 may be determined by the shape of the combined plurality of battery cells, and both the cover body 43 and the lower box body 44 can have an opening. For example, the cover body 43 and the lower box body 44 each can be a hollow cuboid and only one of the surfaces is an opening surface respectively, the opening of the cover body 43 is arranged opposite to the opening of the lower box body 44, and the cover body 43 and the lower box body 44 are buckled to each other to form the box body 42 with a closed chamber. Also, only one of the cover body 43 and the lower box body 44 can be a cuboid with an opening, and the other is a cover plate structure to enclose the opening of the cuboid. The plurality of battery cells are combined in parallel connection or series connection or series-parallel connection and are then placed in the box body 42 formed by buckling the cover body 43 to the lower box body 44.

Optionally, the battery 4 may also include other structures. For example, the battery 4 may also include a busbar. The busbar is used to implement an electrical connection between the plurality of battery cells 45, such as parallel connection, series connection or series-parallel connection. Specifically, the busbar can implement the electrical connection between the battery cells 45 by connecting electrode terminals of the battery cells 45. Furthermore, the busbar can be fixed to the electrode terminals of the battery cells 45 by means of welding. Electrical energy of the plurality of battery cells 45 can be further led out through an electrically conductive mechanism passing through the box body 42. Optionally, the electrically conductive mechanism may also belong to the busbar.

Figure 4:
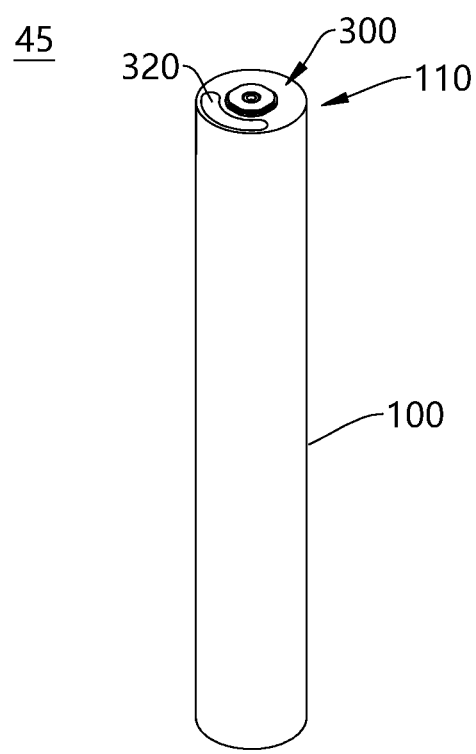
FIG. 4 is a cross-sectional view of a battery cell provided by an embodiment of the present application.
Figure 5:
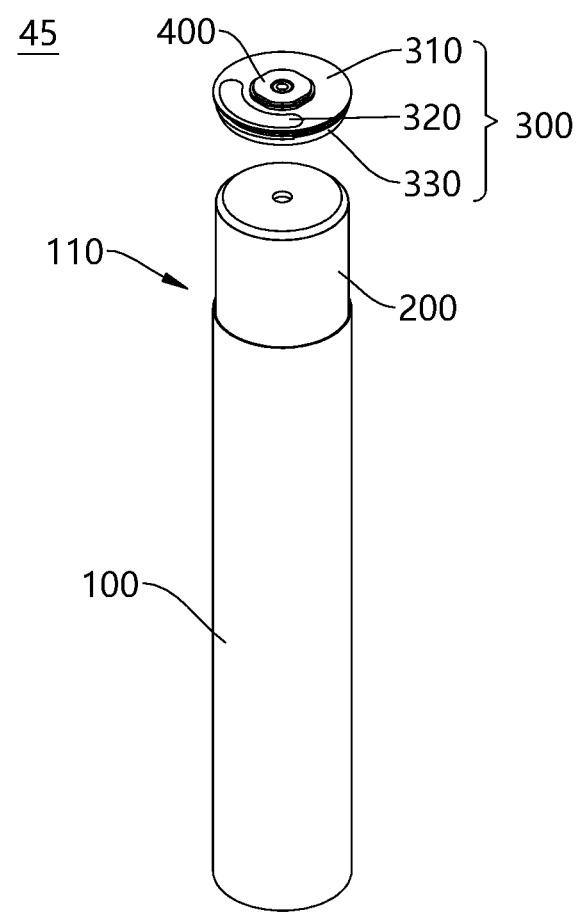
FIG. 5 is an exploded view of a battery cell provided by an embodiment of the present application.

Any battery cell 45 is described in detail in the following. FIG. 4 and FIG. 5 show a battery cell 45 according to an embodiment of the present application, and the battery cell 45 includes a housing 100, an end cover assembly 300 and one or a plurality of electrode assembles 200. The shape of the housing 100 is determined by the shape of one or the plurality of electrode assemblies 200 after combination. For example, the housing 100 may be a hollow cuboid or cube or cylinder, and one surface of the housing 100 has an opening so that one or the plurality of electrode assemblies 200 can be placed in the housing 100. For convenience of description, the opening is hereinafter referred to a first opening 110. For example, when the housing 100 is a hollow cuboid or cube, one of the planes of the housing 100 is a plane with the first opening 110, and the plane is configured to have no wall body, so that the inside and outside of the housing 100 are in communication with each other. When the housing 100 may be a hollow cylinder, an end face of the housing 100 is a surface with the first opening 110, that is, the end face is configured to have no wall body, so that the inside and outside of the housing 100 are in communication with each other. The end cover assembly 300 covers the first opening 110 and is connected to the housing 100 to form an enclosed chamber for placing the electrode assembly 200, and the enclosed chamber is filled with electrolyte, such as the electrolytic solution.

The end cover assembly 300 includes an end cover 310 and a pressure relief mechanism 320, the end cover 310 is used to cover the first opening 110 of the housing 100 and is connected to the housing 100, the pressure relief mechanism 320 is arranged on the end cover 310, and when an internal pressure or temperature of the battery cell 45 reaches a predetermined threshold, the pressure relief mechanism 320 performs an action, or a weak structure provided in the pressure relief mechanism 320 is damaged, thereby relieving the internal pressure of the enclosed chamber.

The battery cell 45 further includes one or a plurality of electrode terminals 400, and the electrode terminal 400 can be arranged on the end cover 310. The end cover 310 is generally in the shape of a flat plate, the electrode terminal 400 is fixed on a flat plate face of the end cover 310, and the electrode terminal 400 is connected with a connecting member, or may also be called an adapting member 500, which is located between the end cover 310 and the electrode assembly 200, and is used to electrically connect the electrode assembly 200 and the electrode terminal 400.

Each electrode assembly 200 has a first electrode tab and a second electrode tab. The first electrode tab and the second electrode tab have opposite polarities. For example, when the first electrode tab is a positive electrode tab, the second electrode tab is a negative electrode tab. The first electrode tab of one or a plurality of electrode assemblies is connected to one electrode terminal through one of the adapting members, for example, a positive electrode terminal; and the second electrode tab of one or the plurality of electrode assemblies is connected to another electrode terminal through another adapting member, for example, a negative electrode terminal. That is, the positive electrode terminal is connected to the positive electrode tab through one of the adapting members, and the negative electrode terminal is connected to the negative electrode tab through another adapting member.

In the battery cell 45, one or more electrode assemblies 200 can be arranged according to actual use requirements. As shown in FIG. 5, an independent electrode assembly 200 is arranged in the battery cell 45.

Figure 6:
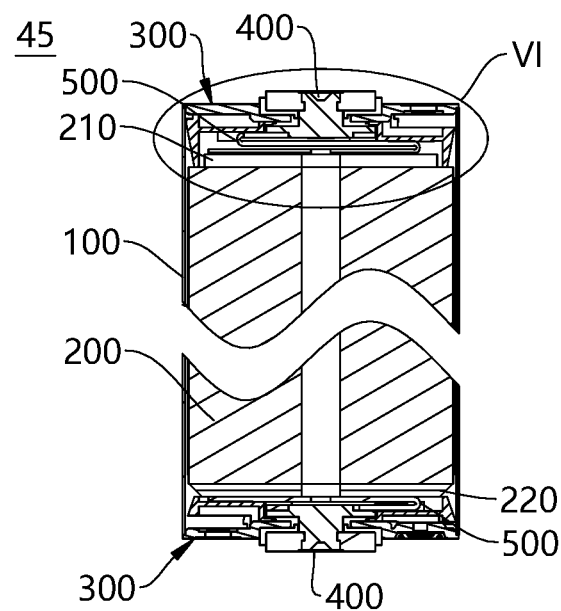
FIG. 6 is a cross-sectional view of a battery cell along it axis provided by an embodiment of the present application.

The first electrode tab 210 and the second electrode tab 220 of the electrode assembly 200 can be arranged at the same end, or as shown in FIG. 6, the first electrode tab 210 and the second electrode tab 220 of the electrode assembly 200 are arranged at two ends, respectively. That is, one end of the electrode assembly 200 is provided with the first electrode tab 210 and another end is provided with the second electrode tab 220. Correspondingly, two ends of the housing 100 of the battery cell 45 has the first opening 110, respectively, and each first opening 110 is provided with the end cover assembly 300, respectively, and the electrode terminal 400 provided in each end cover assembly 300 respectively is connected to a tab through the adapting member 500. The structure of each end cover assembly 300 and its connection structure with the housing 100 can be the same, and the following takes one of the end cover assemblies 300 as an example for description.

Figure 7:
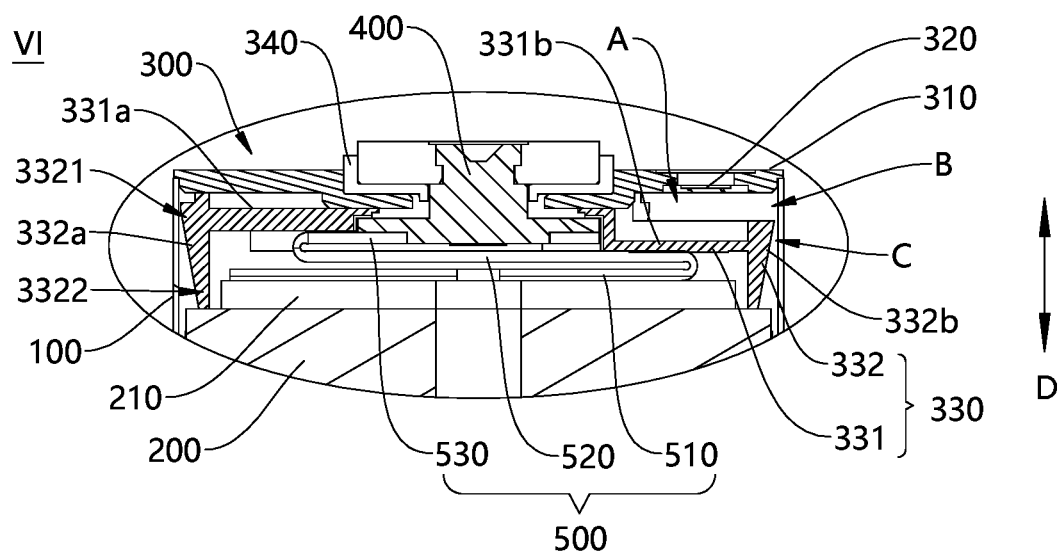
FIG. 7 is an enlarged view of a portion VI of FIG. 6.

As shown in FIG. 7, the end cover assembly 300 further includes a first insulating member 330 and a second insulating member 340. The first insulating member 330 is located at a side of the end cover 310 close to the electrode assembly 200, that is, the first insulating member 330 is located between the end cover 310 and the electrode assembly 200 to isolate the electrode assembly 200 and the end cover 310. The second insulating member 340 is located between the end cover 310 and the electrode terminal 400 to isolate the electrode terminal 400 and the end cover 310.

The first insulating member 330 is configured that a projection of the first insulating member 330 on the end cover 310 along a thickness direction D covers the pressure relief mechanism 320. When the battery cell 45 is impacted or dropped, resulting in the internal electrolytic solution shaking in the housing 100 and impacting towards the end cover 310, the first insulating member 330 blocks the electrolytic solution receives impact instead of the pressure relief mechanism 320, thereby protecting the pressure relief mechanism 320 and preventing the pressure relief mechanism 320 from being damaged.

In the present application, the first insulating member 330 shielding the pressure relief mechanism 320 refers that the first insulating member 330 completely shields the pressure relief mechanism 320 along the thickness direction D of the end cover, or completely shields the weak structure on the pressure relief mechanism 320, so as to prevent the weak structure of the pressure relief mechanism 320 from being damaged due to a direct impact of the electrolytic solution.

In order to take into account the safety of the battery cell 45, in the thickness direction D of the end cover, there is also a first gap A between the first insulating member 330 and the pressure relief mechanism 320. At the same time, a flow path is formed in the battery cell 45, which is used to communicate the inside of the battery cell 45 with the first gap A. When the pressure relief mechanism 320 is actuated, the emissions such as gas inside the battery cell 45 can reach the first gap A through the flow path, and can be relieved from the pressure relief mechanism 320 to the outside of the battery cell 45.

The inside of the battery cell 45 refers to a space formed between the end cover assembly 300 and an inner wall of the housing 100 when the end cover assembly 300 covers the first opening 110 of the housing 100. In the present application, it is a space accommodating the electrode assembly 200 enclosed by the first insulating member 330 and the housing 100.

The first insulating member 330 may be configured to be integrally spaced from the end cover 310, thereby forming the first gap A.

Or, a part of the first insulating member 330 fits or abuts against the end cover 310, and another part is separated from the end cover 310 to form the first gap A. In some embodiments, the first insulating member 330 forms a recess on a side facing the end cover 310, and a projection of the recess on the end cover 310 corresponds to the pressure relief mechanism 320, so that the first gap A is formed between the first insulating member 330 and the pressure relief mechanism 320.

In some embodiments, the end cover 310 may extend beyond the pressure relief mechanism 320 on a surface facing the first insulating member 330, so that a distance between the pressure relief mechanism 320 and the first insulating member 330 is greater than a distance between the end cover 310 and the first insulating member 330, and thus the first gap A is formed between the first insulating member 330 and the pressure relief mechanism 320.

In some embodiments, the adapting member 500 forms a avoidance space at a position corresponding to the pressure relief mechanism 320, so that the first insulating member 330 can be configured further away from the pressure relief mechanism 320, so as to increase the first gap A on the basis of no change of an overall space occupation of a cover plate assembly and the adapting member 500, to improve the relief effect.

Please refer to FIG. 7 again, the adapting member 500 includes a first connection section 510, a second connection section 520 and a third connection section 530, where the first connection section 510 connects the electrode assembly 200, the third connection section 530 connects the electrode terminal 400, and the second connection section connects the first connection section 510 and the second connection section 520.

Folding marks are formed between the first connection section 510 and the second connection section 520, between the second connection section 520 and the third connection section 530, respectively, so that the first connection section 510, the second connection section 520 and the third connection section 530 are stacked in sequence along the thickness direction D of the end cover. The first connection section 510, the second connection section 520 and the third connection section 530 may have different lengths. Here, the length of the first connection section 510 refers to a distance from one end of the adapting member 500 to a folding mark between the first connection section 510 and the second connection section 520, the length of the second connection section 520 refers to a distance from the folding mark between the first connection section 510 and the second connection section 520 to a folding mark between the second connection section 520 and the third connection section 530, and the length of the third connection section 530 refers to a distance from the folding mark between the second connection section 520 and the third connection section 530 to the other end of the adapting member 500. Among them, the length of the third connection section 530 is shorter than that of the second connection section 520, so that the third connection section 530 is stacked on the second connection section 520 to form a stepped structure.

Figure 8:
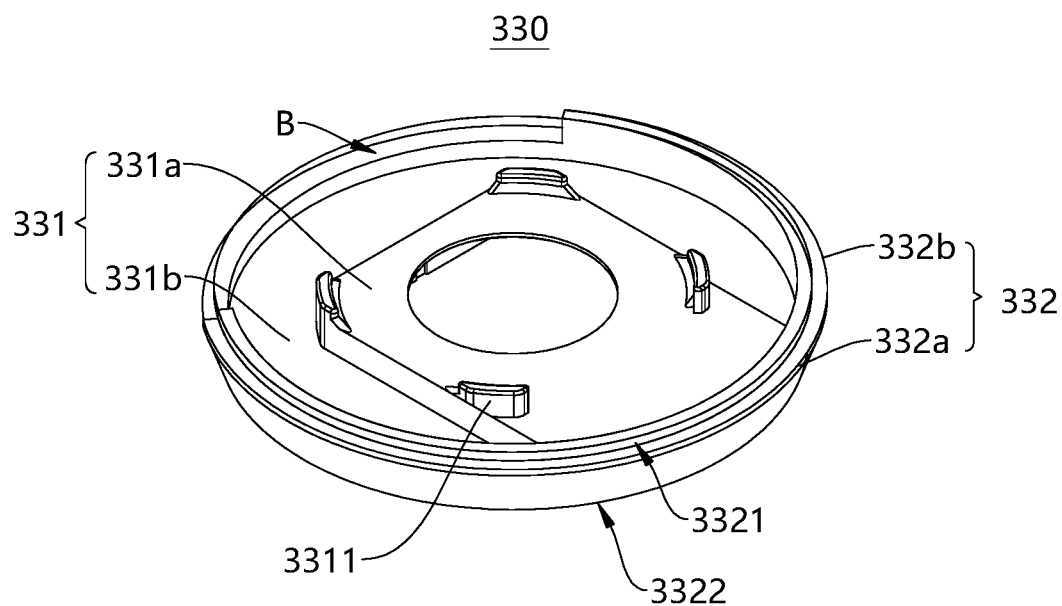
FIG. 8 is a structural schematic diagram of a first insulating member provided by an embodiment of the present application.

As shown in a combination with FIG. 7 and FIG. 8, the first insulating member 330 includes a base wall 331, which includes a first base part 331a and a second base part 331b, the base wall is arranged opposite to the end cover 310, a step is formed between the first base part 331a and the second base part 331b, and here, the step aforementioned refers that a connecting portion of the first base part 331a and the second base part 331b bends to form two planes with height difference. The first base part 331a is arranged between the end cover 310 and the third connection section 530, a side of the second base part 331b tightly presses a part of the second connection section 520 that is not covered by the third connection section 530, and another side of the second base part 331b is spaced apart from the end cover 310 to form the first gap A.

The first insulating member 330 in the embodiment not only forms the first gap A between the second base part 331b and the pressure relief mechanism 320 to ensure the safety of the battery cell 45, but also can transmit pressure through the first base part 331a to tightly press the adapting member 500 to stabilize the assembly.

In some embodiments, the first insulating member 330 may not abut against the adapting member 500, the adapting member 500 may still form the stepped structure by making the third connection section 530 shorter than the second connection section 520, so that the void space is formed in an area on the adapting member 500 corresponding to the pressure relief mechanism 320 to provide the space for forming the first gap A.

In some embodiments, the flow path may include a second opening B formed on the first insulating member 330 (refer to FIG. 7). A projection of the second opening B on the end cover 310 is staggered with the pressure relief mechanism 320 along the thickness direction D of the end cover 310, so that the first insulating member 330 prevents the electrolytic solution from directly impacting the pressure relief mechanism 320 when the electrolytic solution shakes. When the internal pressure or temperature of the battery cell 45 reaches the predetermined threshold, the emissions enter the first gap A through the second opening B to be discharged through the pressure relief mechanism 320.

The second opening B on the first insulating member 330 may be formed on the base wall 331 of the first insulating member 330, and its projection on the end cover 310 is staggered with the pressure relief mechanism 320.

Figure 9:
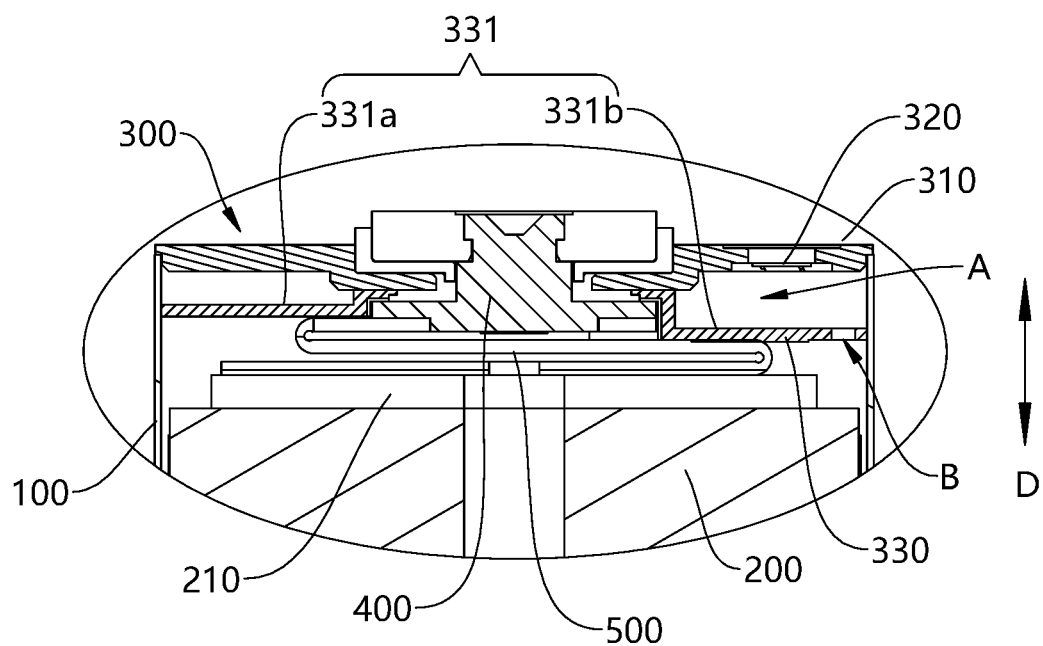
FIG. 9 is a schematic diagram of a second opening of a first insulating member provided by another embodiment of the present application.

For example, as shown in FIG. 9, at a position close to the middle of the base wall 331 (that is, a position away from outer periphery of the base wall 331), a hole is formed on the second base part 331b penetrating from one side to the other, a penetrating direction may be along the thickness direction D of the end cover, or may also be inclined relative to the thickness direction D of the end cover and an inclination angle is less than 90°, and the through hole serves as the second opening B for relieving.

Figure 10:
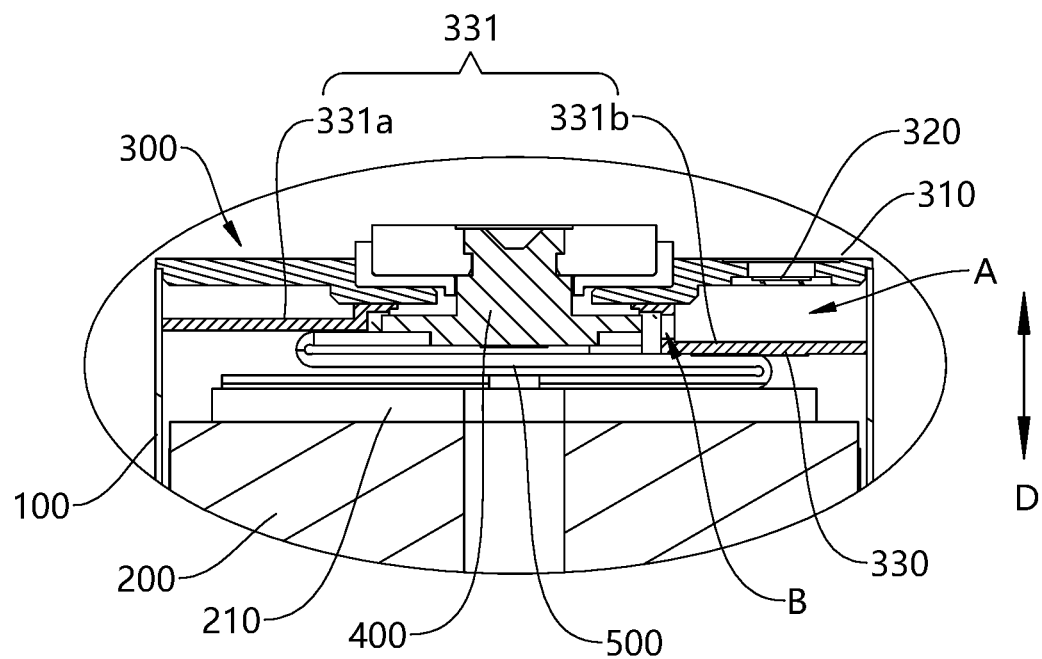
FIG. 10 is a schematic diagram of another second opening of a first insulating member provided by another embodiment of the present application.

The second opening B may also be formed at a connecting portion of the first base part 331a and the second base part 331b, and the connecting portion is the part in the base wall 331 for connecting the first base part 331a and the second base part 331b with the height difference, and the part is at a certain angle with the first base part 331a and the second base part 331b. As shown in FIG. 10, a hole penetrating from one side to the other is formed on the part, and a penetrating direction is perpendicular to the thickness direction D of the end cover, and the through hole communicates the inside of the battery cell with the first gap A, which serves as the second opening for relieving.

Figure 11:
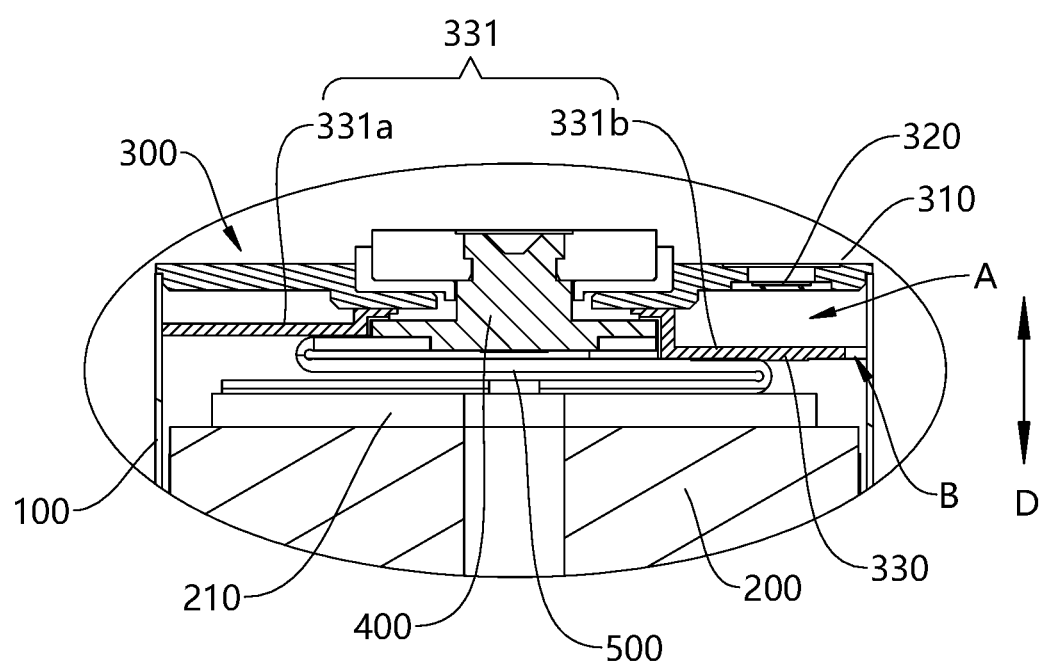
FIG. 11 is a schematic diagram of yet another second opening of a first insulating member provided by another embodiment of the present application.

When the second opening B is close to a middle position of the base wall 331, or when the second opening B is on a part of the connecting portion of the first base part 331a and the second base part 331b, the second opening B is relatively close to a tab of the electrode assembly 200, and the tab may be deformed to block the second opening B. In some embodiments, the second opening B may also be formed on the outer periphery of the second base part 331b, so that the second opening B is relatively far away from the tab. As shown in FIG. 11, the base wall 331 is recessed from the outer periphery along a radial direction to form a gap, which serves as the second opening B for relieving.

Figure 12:
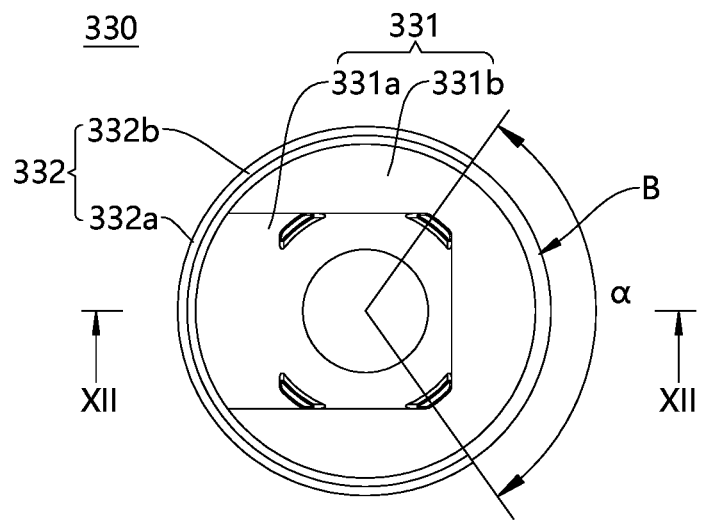
FIG. 12 is a top view diagram of a first insulating member provided by an embodiment of the present application.
Figure 13:
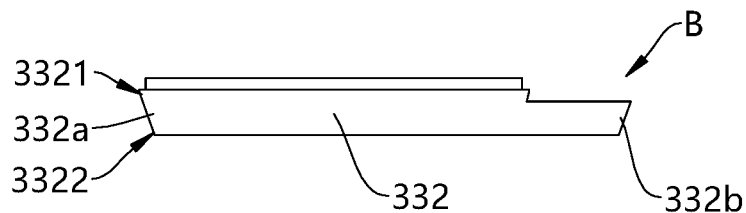
FIG. 13 is a main view diagram of a first insulating member provided by an embodiment of the present application.

In an embodiment provided by the present application, the first insulating member 330 further includes a side wall 332 arranged around the outer periphery of the base wall 331. FIG. 12 shows a top view diagram of the first insulating member 330, and FIG. 13 shows a main view diagram of the first insulating member 330. The side wall 332 increases the structural strength of the base wall 331, so that the base wall 331 is not easily flexed or deformed, so as to transmit the pressure in a better way, so that the end cover 310 tightly presses the adapting member 500 on the electrode assembly 200 through the first insulating member 330, which can effectively prevent the adapting member 500 and the electrode assembly 200 from being dislocated under impact force or other forces, so as to avoid a loose connection between the tab, the adapting member 500 and the electrode terminal 400.

In some embodiments, the second opening B on the first insulating member 330 may also be formed on the side wall 332, at this time, the flow path further includes a second gap C formed between an outer circumferential surface of the first insulating member 330 and the inner wall of the housing 100 (refer to FIG. 7), and along the thickness direction D of the end cover, a projection of the second gap C on the end cover 310 along the thickness direction D of the end cover is staggered with the pressure relief mechanism 320. The second opening B on the side wall 332 communicates the first gap A with the second gap C, and the emissions enter the first gap A through the second opening B after entering the second gap C to be relieved from the pressure relief mechanism 320. When the second opening B is located on the side wall 332, due to its farness from the tab, there is an effect of not being blocked easily by the tab.

For convenience of description, the side wall 332 can be regarded as including a first part 332a and a second part 332b, where the first part 332a is a part connecting the first base part 331a, and the second part 332b is a part connecting the second base part 331b; for further convenience of description, an end of the side wall 332 close to the end cover 310 is a first end 3321, and an end of the side wall 332 away from the end cover 310 is a second end 3322.

In some embodiments, the first end 3321 of the side wall 332 is not in contact with the end cover 310 to form the second opening B communicating the second gap C with the first gap A. For example, the first end 3321 of the side wall 332 is not in contact with the end cover 310 at all, so that an annular-shaped second opening B is defined between an end face of the first end 3321 of the side wall 332 and the end cover 310. At this time, the first end 3321 may not protrude from the base wall 331, or the first end 3321 may protrude from the base wall 331 but not contact the end cover 310.

In other embodiments, a part of the first end 3321 of the side wall 332 is not in contact with the end cover 310, and another part is in contact with the end cover 310, so that an end face of the first end 3321 which is not in contact with the end cover 310 and the end cover 310 define the second opening B. And the second opening B is at least partially located at the second part 332b of the side wall 332, so that the second opening B effectively communicates the first gap A and the second gap C.

Figure 14:
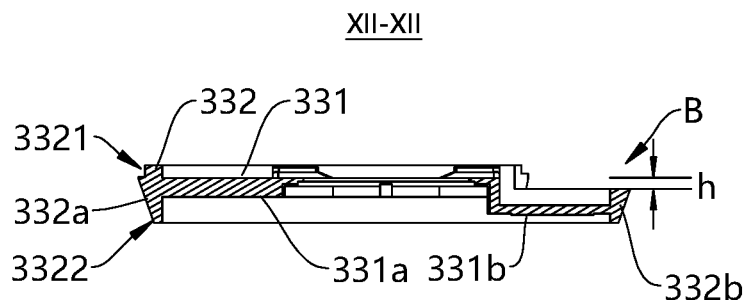
FIG. 14 is a cross-sectional schematic diagram of a first insulating member along XII-XII of FIG. 12.

As shown in FIG. 14, the first end 3321 of the side wall 332 protrudes from the base wall 331 and abuts against the end cover 310, the first end 3321 of the side wall 332 is recessed towards the second end 3322 to form a groove, and the groove serves as the second opening B connecting the first gap A and the second gap C.

When the first end 3321 of the side wall 332 is only partially not in contact with the end cover 310, the base wall 331 is not easy to be deformed due to an action of the side wall 332, and the first end 3321 of the side wall 332 abuts against the end cover 310 to transmit the pressure of the end cover, so that the base wall 331 can tightly press the adaptor in a better way while the groove on the side wall 332 serves as the second opening B to meet discharge requirements.

In order to take into account a relieving function and the structural strength of the first insulating member 330, the second opening B is configured as a groove with a depth less than a height of the first end 3321 protruding from the base wall 331. As shown in FIG. 14, a depth of the second opening B is h, and h is less than a height of the first end 3321 protruding from the second part 332b.

In FIG. 14, it can be seen that a lower edge of the second opening B protrudes from the base wall 331 of the first insulating member 330, so that the side wall 332 can also continuously be arranged around outer circumference of the base wall 331 with the second opening B, so that the base wall 331 has the higher structural strength, is not easy to be deformed, and can transmit force between the end cover 310 and the adapting member 500 or between the end cover 310 and the electrode assembly 200 in a better way.

Figure 15:
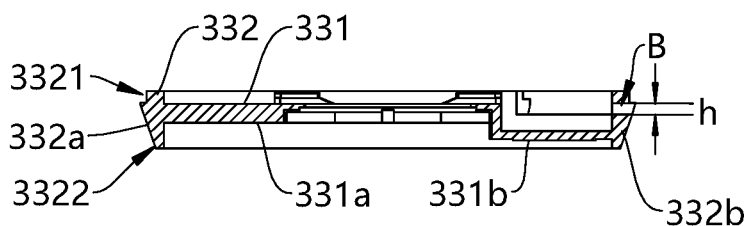
FIG. 15 is a schematic diagram of another second opening of a first insulating member provided by an embodiment of the present application.

In yet another embodiments, as shown in FIG. 15, the second opening B on the first insulating member 330 is a hole formed by penetrating from one side of the side wall 332 to the other, and a penetrating direction is perpendicular to the thickness direction of the end cover 310. In this case, a part of the second opening B is located at the second part 332b, or all the whole second opening B is located at the second part 332b, so that the emissions may easily enter the first gap A through the second opening B.

The second opening B can be a polygonal hole formed by cutting on the side wall 332, or can be a circular hole formed by drilling on the side wall 332, or can be integrally formed during injection molding.

In some embodiments, the second opening B on the second part 332b can be arranged as a plurality, and the plurality of second openings B are arranged at intervals to reduce an influence of the second opening B on the structural strength of the side wall 332, so as to protect the base wall 331 in a better way to prevent the base wall 331 from being deformed.

Figure 16:
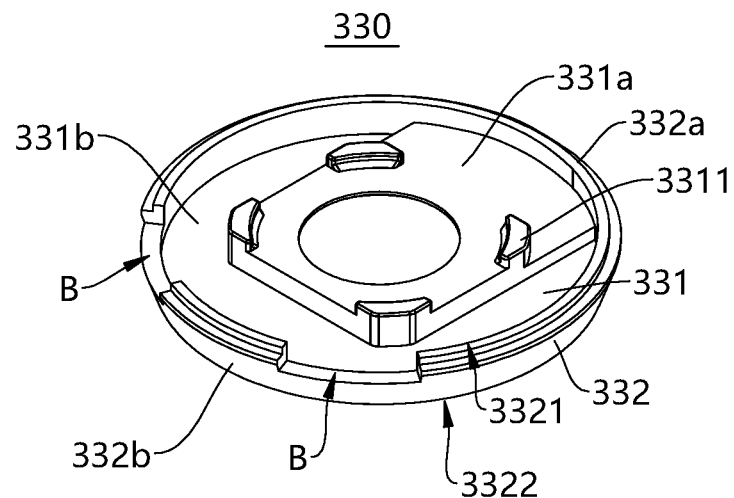
FIG. 16 is a structural schematic diagram of a first insulating member with a plurality of second openings provided by an embodiment of the present application.

When an overall area of the openings on the side wall 332 does not change, the more the number of second openings B, the smaller the area of a single second opening B, and when there are solid particles in the emissions, a smaller second opening B can be easier to be blocked, so the number of second openings B should not be too large. In order to take into account discharge requirements and the structural strength of the side wall 332, in some embodiments, as shown in FIG. 16, the number of the second openings B is arranged as two. In other embodiments, the number of the second openings B may also be three or four, which is not limited hereto.

It should be noted that the plurality of the second openings B shown in FIG. 16 are all recessed from the first end 3321 towards the second end 3322 of the side wall 332 to form the groove, but it does not mean that each second opening B should be the groove when there are the plurality of second openings B. When there are the plurality of second openings B, each of the second opening B may be a type of any one of aforementioned types.

In some embodiments, the flow path may only include the second gap C formed between the outer circumferential surface of the first insulating member 330 and the inner wall of the housing 100. Along the thickness direction D of the end cover, a projection of the second gap C on the end cover 310 along the thickness direction D of the end cover is staggered with the pressure relief mechanism 320.

Figure 17:
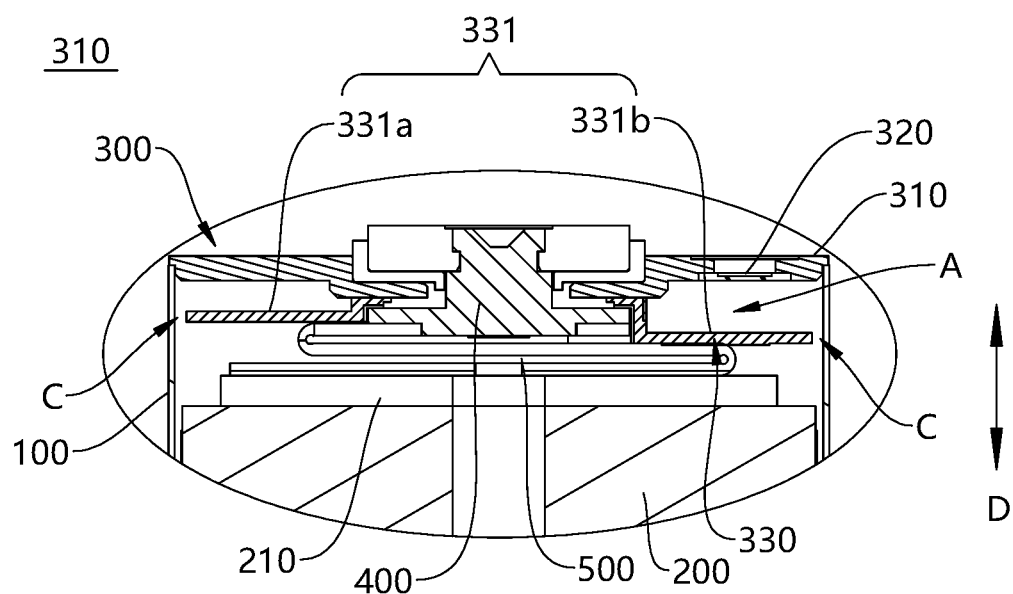
FIG. 17 is a structural schematic diagram of a first insulating member provided by yet another embodiment of the present application.

For example, as shown in FIG. 17, the first insulating member does not include the side wall 332, the outer circumferential surface of the first insulating member 330 (that is, an outer circumferential surface of the base wall 331) is not in contact with the inner wall of the housing 100 at all, so as to form the second gap C.

Figure 18:
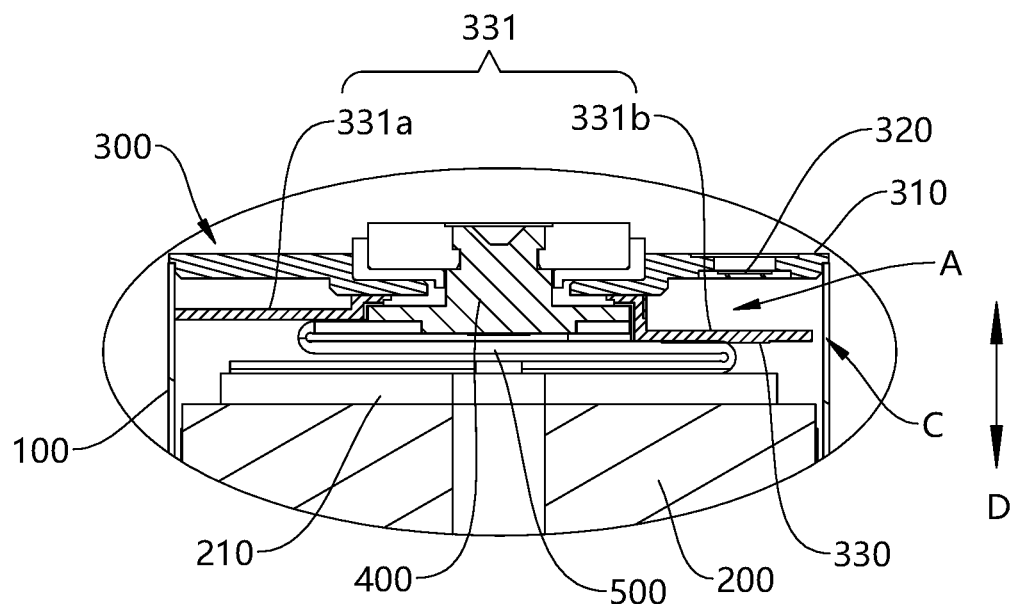
FIG. 18 is a structural schematic diagram of another second gap of a first insulating member provided by yet another embodiment of the present application.

Or, a part of the outer circumferential surface of the first insulating member 330 is not in contact with the inner wall of the housing 100 to form the second gap C. As shown in FIG. 18, the outer circumferential surface of the first insulating member 330 at the first base part 331a abuts against the inner wall of the housing 100, and the outer circumferential surface at the second base part 331b is not in contact with the inner wall of the housing 100.

The second gap C not only allows the emissions to enter the first gap A through the second gap C when the internal pressure or temperature of the battery cell 45 reaches the predetermined threshold, but also ensures that the electrolytic solution cannot pass through the second gap C to directly impact the pressure relief mechanism 320, so that the first insulating member 330 has an effect of protecting the pressure relief mechanism 320.

In general, an air pressure value inside the battery cell 45 and at the first gap A are equal, but in an event of incontrollable gas production or abnormal temperature rise, air pressure inside the battery cell 45 increases sharply, and if the flow path cannot discharge the air pressure timely, the gas inside the battery cell 45 cannot immediately enter the first gap A, which may easily cause that the air pressure value inside the first gap A has not yet reached a valve opening pressure value of the pressure relief mechanism 320 (that is, a pressure value that prompts the pressure relief mechanism 320 to be actuated) when a pressure value inside the battery cell 45 rises to a set limit pressure value (that is, a pressure value that may cause the battery cell 45 to explode). Generally speaking, the valve opening pressure value of the pressure relief mechanism 320 is about one half of the limit pressure value of the battery cell 45. In order to ensure the safety of the battery cell 45, a minimum gas flow area of the flow path is configured to be greater than or equal to one half of the area of the pressure relief mechanism 320.

For ease of understanding, it is assumed that the limit pressure value of the battery cell 45 is 3 Mpa and the valve opening pressure value of the pressure relief mechanism 320 is 1.5 Mpa in the embodiment for illustration.

In the case that the air pressure is discharged timely, that is, when the minimum gas flow area of the flow path is at least the same as an exhaust area of the pressure relief mechanism 320, the pressure value inside the battery cell 45 is equal to the pressure value in the first gap A, and when the pressure value inside the battery cell 45 reaches 1.5 Mpa, the pressure relief mechanism 320 is actuated to ensure that the pressure value inside the battery cell 45 and the pressure value in the first gap A are always 1.5 Mpa.

When the minimum gas flow area of the flow path is reduced relative to the exhaust area of the pressure relief mechanism 320, rapid gas production can cause the pressure value inside the battery cell 45 to be greater than the pressure value in the first gap A.

If the minimum gas flow area of the flow path is smaller than the area of the pressure relief mechanism 320 and is greater than one half of the area of the pressure relief mechanism 320, when the pressure value inside the battery cell 45 is greater than 1.5 Mpa and less than 3 Mpa, the pressure value in the first gap A will reach 1.5 Mpa to actuate the pressure relief mechanism 320 to prevent the battery cell 45 from exploding.

If the minimum gas flow area of the flow path is reduced to one half of the area of the pressure relief mechanism 320, when the pressure value inside the battery cell 45 approaches the limit pressure value 3 Mpa, the pressure value in the first gap A will approach 1.5 Mpa to actuate the pressure relief mechanism 320 prevent the battery cell 45 from exploding caused by the pressure value inside the battery cell 45 exceeding 3 Mpa.

In order to keep the minimum gas flow area of the flow path greater than or equal to one half of the area of the pressure relief mechanism 320: in an embodiment with the second opening B, the area of the second opening B is greater than or equal to one half of the area of the pressure relief mechanism 320; and in an embodiment with the second gap C, the minimum gas flow area of the second gap C is greater than one half of the area of the pressure relief mechanism 320.

The minimum ventilation area of the second gap C in the embodiment refers: a cross section is made along a radial direction of the battery cell 45, when a cross-sectional area of the second gap C is the minimum, the cross-sectional area of the second gap C here is the minimum gas flow area.

The outer circumferential surface of the first insulating member 330 may be in contact with the housing 100 due to manufacturing errors, which blocks the second gap C and affects a normal operation of the pressure relief mechanism 320. The outer circumferential surface of the first insulating member 330 is at least partially formed as an inclined face, so that a width of the second gap C gradually increases along a direction away from the end cover 310. At the same time, in the case that the minimum gas flow area does not change, the outer circumferential surface of the first insulating member 330 is configured as the inclined face, so that the second gap C forms a shape with a relatively large inlet and a relatively small outlet, which is convenient for the emissions to enter the second gap C, and converge under an action of the pressure and then be discharged towards the outlet. The second gap C has a better flow guiding effect, stabilizes a discharge flow path of the emissions, increases a discharge rate, and enhances a pressure relief effect.

The second gap C extends at least from the lower edge of the second opening B to the second end 3322, and the closer the outer circumferential surface of the side wall 332 is to the second end 3322, the farther it is from the housing 100. Taking FIG. 19 as an example, the lower edge of the second opening B refers to an edge of the second opening B away from the end cover 310, the width of the second gap C here is k, and a difference between the width of the second gap C and k gradually increases along a direction away from the end cover 310.

In some embodiments, the second gap C extends from the first end 3321 to the second end 3322, that is, the outer circumferential surface of the first insulating member 330 is inclined from the first end 3321 to the second end 3322, so that further avoids blocking the second opening B caused by contact between the outer circumferential surface of the first insulating member 330 and the housing 100 due to manufacturing tolerances.

In some embodiments, the side wall 332 can be configured of a conical shape, and the second gap C is formed between the entire side wall 332 and the housing 100 to communicate the inside of the battery cell 45 with the first gap A.

In other embodiments, the side wall 332 can be configured to form the inclined face only on the outer peripheral surface of a position corresponding to the second opening B, so that the first part 332a of the side wall 332 abuts against the housing 100 to improve assembly stability of the first insulating member 330, and the second gap C is formed between the second part 332b and the housing 100 to communicate the inside of the battery cell 45 with the first gap A.

Figure 19:
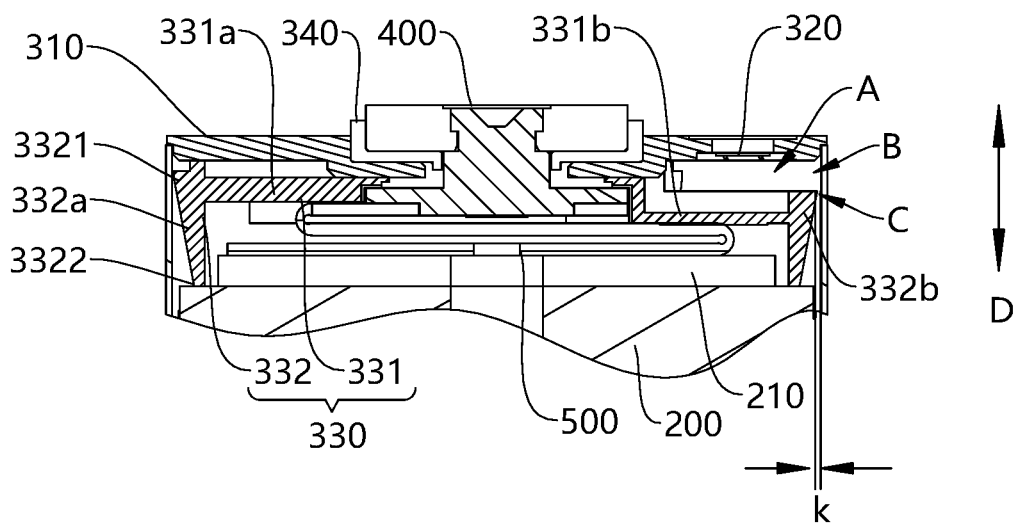
FIG. 19 is a partial schematic diagram of a battery cell cut along its axis provided by an embodiment of the present application.

In some embodiments, the end cover 310 abuts against the electrode assembly 200 through the adapting member 500, but sometimes there is a gap between each connecting section of the adapting member 500, causing that the electrode assembly 200 may still be able to shake. As shown in FIG. 19, the side wall 332 is configured that the first end 3321 abuts against the end cover 310 and the second end 3322 abuts against the electrode assembly 200, so that the end cover 310 directly presses the electrode assembly 200 through the side wall 332, thereby further limiting the movement of the electrode assembly 200.

When the first end 3321 abuts against the end cover 310, the first end 3321 is close to a welding seam at a connecting portion of the housing 100 and the end cover 310, and when welding the housing 100 and the end cover 310, the first end 3321 of the first insulating member 330 is easy to be deformed by high temperature. In some embodiments, a corner at an intersection of an end surface of the first end 3321 and the outer circumferential surface of the first end 3321 is chamfered or cut to recess from a surface of the first end 3321, so as to form an interval between the welding seam and the first end 3321 of the side wall 332. Due to an effect of the interval, the first end 3321 is not easily burned during a process of welding the connecting portion of the housing 100 and the end cover 310 at high temperature to form the welding seam, which prevents the side wall 332 from being thermally deformed at the high temperature generated during the welding, solves a problem that the side wall 332 cannot abut against the end cover 310 and the electrode assembly 200 due to thermal damage and deformation, and avoids a poor position constraint of the electrode assembly 200.

Figure 20:
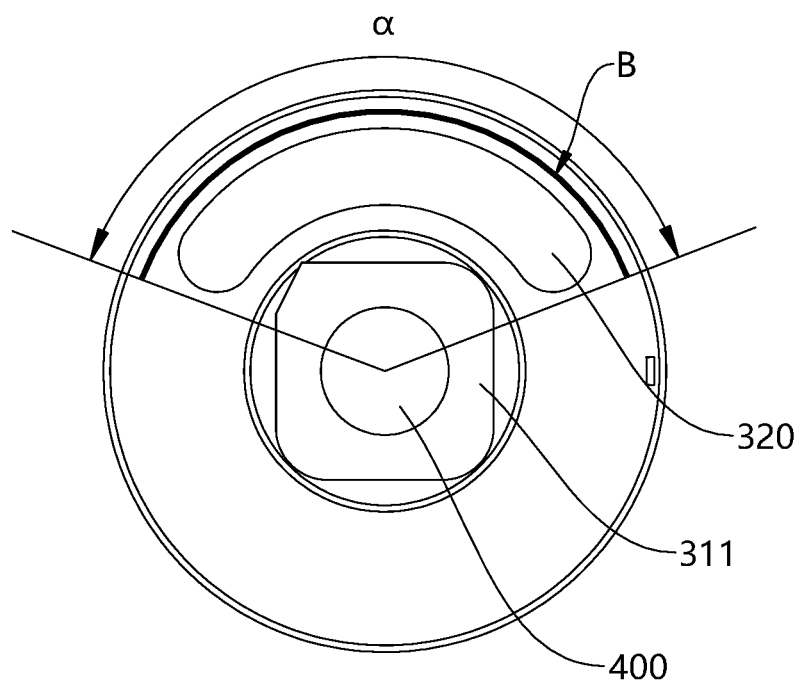
FIG. 20 is a schematic diagram of a projection of a second opening on an end cover provided by an embodiment of the present application.
Figure 21:
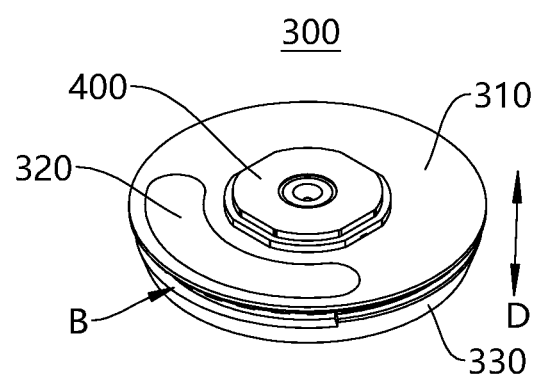
FIG. 21 is a structural schematic diagram of an end cover assembly provided by an embodiment of the present application.

When the emissions need to travel a long distance from the inside of the battery cell 45 to the pressure relief mechanism 320, a response speed of the pressure relief mechanism 320 is relatively slow. In some embodiments, as shown in a combination of FIG. 20 and FIG. 21, a central angle corresponding to a projection of the second opening B or the second gap C on the end cover 310 at least partially overlaps with a part of a central angle corresponding to the pressure relief mechanism 320 along the thickness direction D of the end cover.

A projection of the second opening B on the end cover 310 forms an arc, a corresponding central angle of the arc is α, and two radii of the end cover 310 pass through two ends of the arc and form a fan-shaped sector with the arc. The pressure relief mechanism 320 is located within the fan-shaped sector, which makes the second opening B be closer to the pressure relief mechanism 320, and the emissions can reach the pressure relief mechanism 320 more smoothly and quickly to improve the response speed of the pressure relief mechanism. Here, the second opening B is taken as an example for description, and the second gap C is the same.

Figure 22:
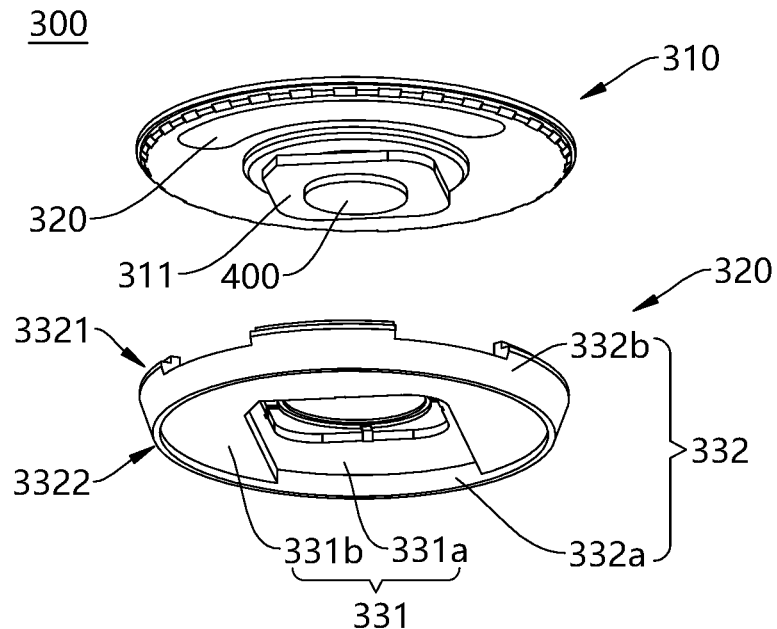
FIG. 22 is an exploded view of an end cover assembly in a perspective provided by an embodiment of the present application.
Figure 23:
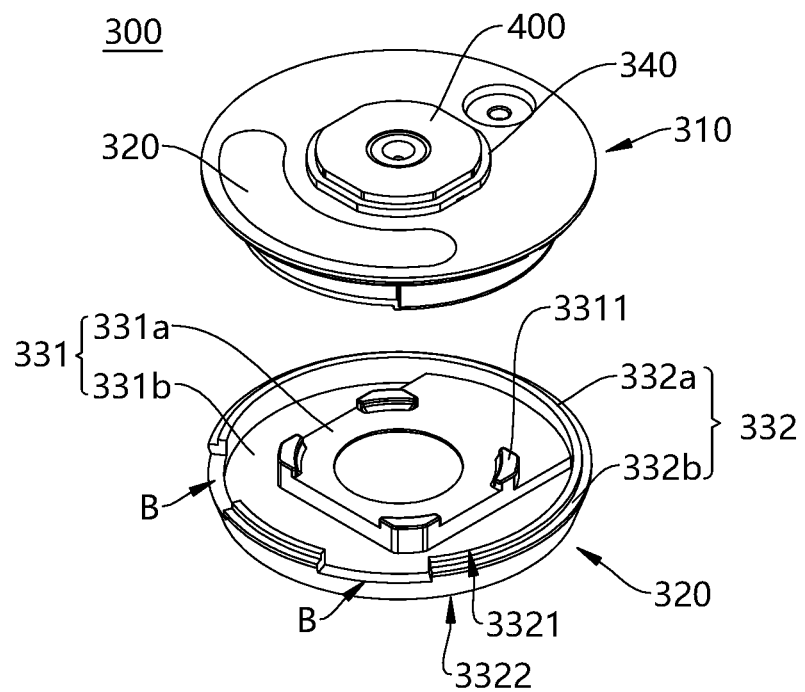
FIG. 23 is an exploded view of an end cover assembly in another perspective provided by an embodiment of the present application.

In order to prevent that the end cover 310 is staggered with the first insulating member 330, resulting a change of a relative position between the second opening B or the second gap C and the pressure relief mechanism 320, affecting the response speed of the pressure relief mechanism 320, as shown in FIG. 22 and FIG. 23, in some embodiments, a first positioning portion 311 is arranged on the end cover 310, a second positioning portion 3311 is arranged on the base wall 331, and the first positioning portion 311 is matched with the second positioning portion 3311 to implement a circumferential positioning of the end cover 310 and the first insulating member 330.

When the end cover 310 and the first insulating member 330 are assembled together along the axial direction, the first positioning portion 311 is matched with second positioning portion 3311, so that the end cover 310 and the first insulating member 330 will not dislocate in the radial direction and in the circumferential direction. The end cover assembly 300 has better stability after being assembled as a whole, and a relative position of the second opening B and the pressure relief mechanism 320 can be kept constant to ensure the response speed of the pressure relief mechanism 320, and ensure the first insulating member 330 to fully shield the pressure relief mechanism 320 as preset mode. Moreover, the end cover 310 and the first insulating member 330 can be assembled quickly and accurately through the first positioning portion 311 and the second positioning portion 3311.

The first positioning portion 311 is a first protrusion formed on one side of the end cover 310 facing the first insulating member 330, and the second positioning portion 3311 is configured as a plurality of second protrusions formed on one side of the base wall 331 facing the end cover 310. The first protrusion is inserted among the plurality of second protrusions, and the plurality of second protrusions surround the first protrusion and match with each other to abut against the first protrusion, so as to restrict a movement of the first protrusion along a surface of the first insulating member 330, thereby restricting the movement of the end cover 310 relative to the first insulating member 330.

In some embodiments, the first protrusion is a polygon, the plurality of second protrusions are arranged at corners of the polygon, respectively, and each second protrusion is configured to abut against the two faces which form the corners. In some embodiments, a corner of the first protrusion is chamfered to form a curved surface, and the surface of the second protrusion has the same curvature as the curved surface.

In an embodiment, the electrode terminal 400 is located at the first protrusion, a thickness of the end cover 310 at the first protrusion is relatively large, and through arranging the electrode terminal 400 at the first protrusion, a length of the electrode terminal 400 passing through the end cover 310 can be increased, and the assembly of the electrode terminal 400 could be more stable.

The first insulating member 330 is formed with a through hole which allows the electrode terminal 400 to pass through to connect with the adapting member 500, and when the electrode terminal 400 is located at the first protrusion, the through hole is arranged in a range surrounded by the plurality of second protrusions to accommodate the first protrusion. That is, the plurality of second protrusions not only surround and abut against the first protrusion, but also surround around a circumferential direction of the electrode terminal 400. When an end of the electrode terminal 400 extending out of the end cover 310 is wrenched or tackled, the plurality of the second protrusion provide reaction force through the first protrusion around the periphery of the electrode terminal 400, the first protrusion bears the force together with the electrode terminal 400, to alleviate the bend and deformation of the electrode terminal 400.

In some embodiments, the first positioning portion 311 may also be configured as a recess formed on one side of the end cover 310 facing the electrode assembly 200, and the recess is adapted with the first protrusion on the base wall 331. Of course, the first positioning portion 311 may also be configured as a protrusion formed on one side of the end cover 310 facing the electrode assembly 200, and the second positioning portion 3311 is configured as a recess formed on one side of the base wall 331 facing the end cover 310.

In some embodiments, the second positioning portion 3311 may also be formed on the end surface of the first end 3321 of the side wall 332, and when the first end 3321 abuts against the end cover 310, the second positioning portion 3311 formed on the first end 3321 is matched with the first positioning portion 311 on the end cover 310.

The battery cell 45, the battery 4 and the power consuming apparatus of the embodiments of the present application are described above, and a method and an apparatus for producing a battery cell 45 according to the embodiments of the present application will be described below. For the parts that are not described in detail, reference is made to the foregoing embodiments.

Figure 24:
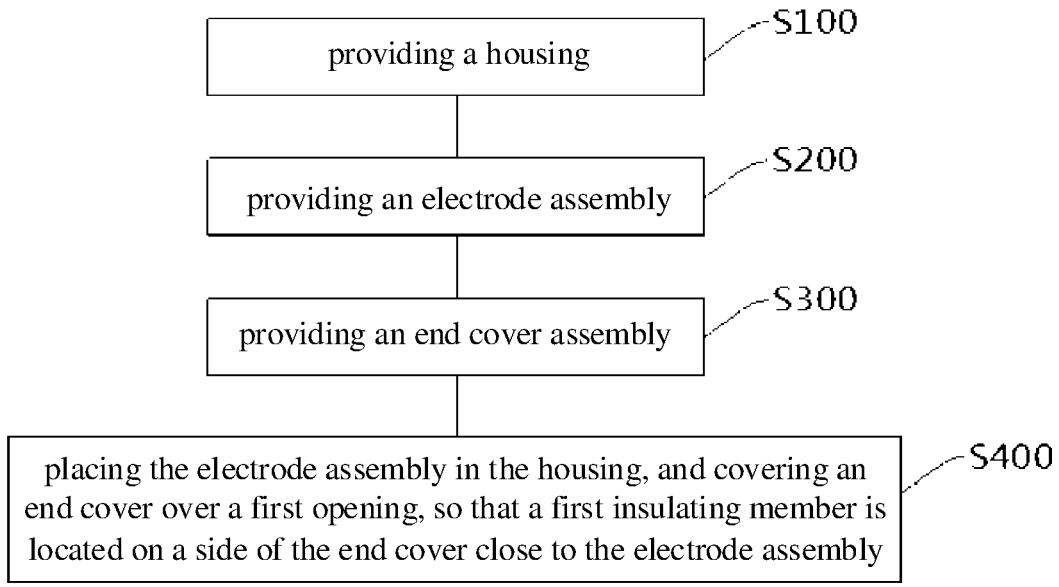
FIG. 24 is a schematic flowchart of a method for producing a battery cell provided by an embodiment of the present application.

FIG. 24 shows a schematic flowchart of a method for producing a battery cell 45 according to an embodiment of the present application, and the method can include:

S100, providing a housing 100, and the housing 100 has a first opening 110;

S200, providing an electrode assembly 200;

S300, providing an end cover assembly 300, the end cover assembly 300 includes an end cover 310, a pressure relief mechanism 320 and a first insulating member 330, the pressure relief mechanism 320 is arranged on the end cover 310, the pressure relief mechanism 320 is configured, when an internal pressure or temperature of the battery cell 45 reaches a threshold, to be actuated to relieve the internal pressure of the battery cell 45, the first insulating member 330 is located on a side of the end cover 310, and the first insulating member 330 is configured that a projection on the end cover 310 along a thickness direction D of the end cover 310 covers the pressure relief mechanism 320 to protect the pressure relief mechanism 320;

S400, placing the electrode assembly 200 in the housing 100, and cover the end cover 310 over the first opening 110, so that the first insulating member 330 is located on a side of the end cover 310 close to the electrode assembly 200 to isolate the electrode assembly 200 and the end cover 310.

Figure 25:
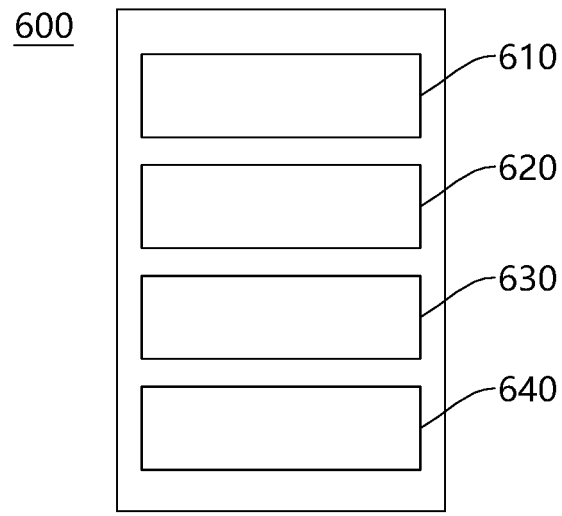
FIG. 25 is a schematic block diagram of an apparatus for producing a battery cell provided by an embodiment of the present application.

FIG. 25 shows a schematic block diagram of an apparatus 600 for producing a battery cell 45 according to an embodiment of the present application, and the apparatus 600 for producing can include: a first providing apparatus 610, a second providing apparatus 620, a third providing apparatus 630 and an assembling apparatus 640.

The first providing apparatus 610, configured to provide a housing 100, and the housing 100 has a first opening 110;

the second providing apparatus 620, configured to provide an electrode assembly 200;

the third providing apparatus 630, configured to provide an end cover assembly 300, the end cover assembly 300 includes an end cover 310, a pressure relief mechanism 320 and a first insulating member 330, the pressure relief mechanism 320 is arranged on the end cover 310, the pressure relief mechanism 320 is configured when an internal pressure or temperature of the battery cell 45 reaches a threshold to be actuated to relieve the internal pressure of the battery cell 45, the first insulating member 330 is located on a side of the end cover 310, and the first insulating member 330 is configured that a projection on the end cover 310 along a thickness direction D of the end cover 310 covers the pressure relief mechanism 320 to protect the pressure relief mechanism 320;

the assembling device 640, configured to place the electrode assembly 200 in the housing 100, and cover the end cover 310 over the first opening 110, so that the first insulating member 330 is located on a side of the end cover 310 close to the electrode assembly 200 to isolate the electrode assembly 200 and the end cover 310.

The foregoing descriptions are only better embodiments of the present application, and are not intended to limit the present application. For those skilled in the art, the present application may have various modifications and changes. Any modification, equivalent replacement, improvement, or the like made within the spirit and principle of this application shall fall within the protection scope of this application.

What is claimed is:

1. A battery cell, comprising:
    a housing, with a first opening;
    an electrode assembly, arranged in the housing;
    an end cover assembly, comprising an end cover, a pressure relief mechanism and a first insulating member,
        the end cover covers the first opening, the pressure relief mechanism is arranged at the end cover,
        the pressure relief mechanism is configured to be actuated to relieve the internal pressure of the battery cell when an internal pressure or temperature of the battery cell reaches a threshold,
        the first insulating member is located on a side of the end cover close to the electrode assembly and in-between the electrode assembly and the end cover, and
        the first insulating member is configured that a projection of the first insulating member on the end cover along a thickness direction of the end cover covers the pressure relief mechanism to protect the pressure relief mechanism;
    an electrode terminal fixed to the end cover; and
    an adapting member configured to be connected to the electrode terminal and the electrode assembly;
    wherein the pressure relief mechanism and the first insulating member are configured with a first gap formed between the end cover and a base wall of the first insulating member, the base wall arranged opposite to the end cover in the thickness direction of the end cover, the battery cell further comprises a flow path, and the flow path is configured to communicate the inside of the battery cell with the first gap;
    wherein the first insulating member includes a second opening configured to allow gas inside the battery cell to pass through the first insulating member and reach the pressure relief mechanism when the internal pressure of the battery cell reaching toward the threshold; and
    wherein the base wall of the first insulating member presses against the adapting member in the thickness direction of the end cover.

2. The battery cell according to claim 1, wherein the second opening is located at an outer perimeter of the first insulating member.

3. The battery cell according to claim 2, wherein
    the first insulating member further comprises a side wall, the side wall is arranged around the outer perimeter of the base wall, and the second opening is arranged on the side wall.

4. The battery cell according to claim 3, wherein
    the adapting member comprising a first connection section, a second connection section and a third connection section, all of which configured to be folded and stacked in sequence,
    wherein the first connection section is configured to be connected with the electrode assembly, the third connection section is configured to be connected with the electrode terminal, and the second connection section is configured to connect the first connection section and the third connection section;
    the base wall comprises a first base and a second base, a step is formed between the first base and the second base, the first base abuts against the third connection section, and the second base abuts against the second connection section; and
    the side wall comprises a first part and a second part, the first part is connected to the outer perimeter of the first base, the second part is connected to the outer perimeter of the second base, and the second opening is arranged at the second part.

5. The battery cell according to claim 3, wherein
    the side wall has a first end close to the end cover and a second end away from the end cover, and the second opening is a groove of the side wall recessed from the first end towards the second end.

6. The battery cell according to claim 5, wherein
    the first end protrudes from the base wall, and a depth of the groove is smaller than a height of the first end protruding from the base wall.

7. The battery cell according to claim 6, wherein
    the first end abuts against the end cover, and the second end abuts against the electrode assembly.

8. The battery cell according to claim 5, wherein the first end abuts against the end cover, and the second end abuts against the electrode assembly.

9. The battery cell according to claim 1, wherein
    a central angle corresponded to a projection of the second opening projected on the end cover along the thickness direction of the end cover at least partially overlaps with a central angle corresponded to the pressure relief mechanism.

10. The battery cell according to claim 1, wherein
    a first positioning portion is arranged on the end cover, a second positioning portion is arranged on the base wall, and the first positioning portion is matched with the second positioning portion to implement a peripheral positioning of the end cover and the first insulating member.

11. The battery cell according to claim 1, wherein an area of the second opening is greater than or equal to one half of an area of the pressure relief mechanism.

12. The battery cell according to claim 1, wherein the flow path comprises a second gap formed between an outer perimeter of the first insulating member and an inner wall of the housing, and the second gap is configured that a projection of the second gap on the end cover along the thickness direction of the end cover is staggered with the pressure relief mechanism.

13. The battery cell according to claim 12, wherein a smallest gas flow area of the second gap is greater than or equal to one half of the area of the pressure relief mechanism.

14. The battery cell according to claim 12, wherein at least part of the outer perimeter of the first insulating member is an inclined face, so that a width of the second gap gradually increases along a direction away from the end cover.

15. A battery, comprising the battery cell according to claim 1.

16. A power consumption apparatus, comprising the battery according to claim 15, wherein the battery is configured to provide electric energy.

17. The battery cell according to claim 1, wherein the second opening is formed on the base wall of the first insulating member.

18. The battery cell according to claim 1, wherein the adapting member comprising a first connection section, a second connection section and a third connection section, all of which configured to be folded and stacked in sequence, wherein the first connection section is configured to be connected with the electrode assembly, the third connection section is configured to be connected with the electrode terminal, and the second connection section is configured to connect the first connection section and the third connection section;
wherein the first insulating member comprises a base wall, the base wall comprises a first base and a second base, a step is formed between the first base and the second base, the first base abuts against the third connection section, and the second base abuts against the second connection section.

19. The battery cell according to claim 18, wherein:
the first gap is formed between the end cover and the second base, a second gap is formed between the end cover and the first base, the first gap and the second gap are connected to allow gas flow between the first gap and the second gap;
a first distance between the end cover and the second base is larger than a second distance between the end cover and the first base; and
the projection of the first insulating member comprises a projection of the second base on the end cover along the thickness direction of the end cover to cover the pressure relief mechanism.

20. A method for producing a battery cell, comprising:
providing a housing, and the housing has a first opening;
providing an electrode assembly and an electrode terminal;
providing an adapting member configured to be connected to the electrode terminal and the electrode assembly;
providing an end cover assembly, the end cover assembly comprises an end cover, a pressure relief mechanism and a first insulating member,
the pressure relief mechanism is arranged at the end cover, the pressure relief mechanism is configured to be actuated to relieve the internal pressure of the battery cell when an internal pressure or temperature of the battery cell reaches a threshold,
the first insulating member is located on a side of the end cover in-between the electrode assembly and the end cover, and the first insulating member is configured that a projection of the first insulating member on the end cover along a thickness direction of the end cover covers the pressure relief mechanism to protect the pressure relief mechanism,
wherein the pressure relief mechanism and the first insulating member are configured with a first gap in the thickness direction of the end cover, the battery cell further comprises a flow path, and the flow path is configured to communicate the inside of the battery cell with the first gap,
wherein the first insulating member includes a second opening configured to allow gas inside the battery cell to pass through the first insulating member and reach the pressure relief mechanism when the internal pressure of the battery cell reaching toward the threshold, and
placing the electrode assembly in the housing, fixing the electrode terminal to the end cover, and covering the end cover over the first opening, so that the first insulating member is located on a side of the end cover close to the electrode assembly to isolate the electrode assembly and the end cover and the base wall of the first insulating member presses against the adapting member in the thickness direction of the end cover.

21. An apparatus for producing a battery cell, comprising:
a first providing apparatus, configured to provide a housing, and the housing has a first opening;
a second providing apparatus, configured to provide an electrode assembly, an electrode terminal, and an adapting member configured to be connected to the electrode terminal and the electrode assembly;
a third providing apparatus, configured to provide an end cover assembly,
the end cover assembly comprises an end cover, a pressure relief mechanism and a first insulating member,
the pressure relief mechanism is arranged at the end cover, the pressure relief mechanism is configured to be actuated to relieve the internal pressure of the battery cell when an internal pressure or temperature of the battery cell reaches a threshold,
the first insulating member is located on a side of the end cover in-between the electrode assembly and the end cover, and the first insulating member is configured that a projection of the first insulating member on the end cover along a thickness direction of the end cover covers the pressure relief mechanism to protect the pressure relief mechanism,
wherein the pressure relief mechanism and the first insulating member are configured with a first gap formed between the end cover and a base wall of the first insulating member, the base wall arranged opposite to the end cover in the thickness direction of the end cover, the battery cell further comprises a flow path, and the flow path is configured to communicate the inside of the battery cell with the first gap, wherein the first insulating member includes a second opening configured to allow gas inside the battery cell to pass through the first insulating member and reach the pressure relief mechanism when the internal pressure of the battery cell reaching toward the threshold; and an assembling apparatus, configured to place the electrode assembly in the housing, and cover the end cover at the first opening, so that the first insulating member is located on a side of the end cover close to the electrode assembly to isolate the electrode assembly and the end cover and the base wall of the first insulating member presses against the adapting member in the thickness direction of the end cover.

* * * * *